United States Patent

Yamanashi

[11] Patent Number: 5,917,658
[45] Date of Patent: *Jun. 29, 1999

[54] ZOOM LENS SYSTEM

[75] Inventor: Takanori Yamanashi, Kokubunji, Japan

[73] Assignee: Olympus Optical Co. Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/606,526

[22] Filed: Feb. 23, 1996

[30] Foreign Application Priority Data

Feb. 24, 1995 [JP] Japan ................................. 7-037077

[51] Int. Cl.$^6$ ................................................ G02B 15/14
[52] U.S. Cl. ........................................... 359/676; 359/683
[58] Field of Search .................................... 359/683, 687, 359/686, 688, 684, 682, 681, 676

[56] References Cited

U.S. PATENT DOCUMENTS

| | | | |
|---|---|---|---|
| 4,054,372 | 10/1977 | Schroeder | 359/683 |
| 4,135,786 | 1/1979 | Ikemori | 359/683 |
| 4,468,097 | 8/1984 | Hamanishi | 359/687 |
| 5,059,007 | 10/1991 | Tanaka | 359/676 |
| 5,204,779 | 4/1993 | Nakata et al. | 359/688 |
| 5,309,284 | 5/1994 | Nakatsuji | 359/687 |

*Primary Examiner*—Georgia Epps
*Assistant Examiner*—Jordan M. Schwartz
*Attorney, Agent, or Firm*—Pillsbury Madison & Sutro LLP

[57] ABSTRACT

The present invention relates to a telephoto zoom lens system which is less variable in terms of aberrations incidental to zooming and focusing, and is of high image quality and large aperture ratio as well, and which consists essentially of a first lens group G1 having a positive refracting power, a second lens group G2 having a negative refracting power, a third lens group G3 having a negative refracting power, a fourth lens group G4 having a positive refracting power and a fifth lens group G5 having a positive refracting power. For zooming from the wide-angle zone to the telephoto zone, the second and third lens groups G2 and G3 are moved in conformity to specific conditional inequalities while the first and fifth lens groups G1 and G5 remain fixed, and fourth lens group G4 is moved separately from the movable lens groups G2 and G3 while acting primarily as means for compensating for an image surface position. Conditions concerning the zoom ratio that the second and third lens groups G2 and G3 bear and the zooming function of the third lens group G3 as well as conditions that the separation between the second and third lens groups G2 and G3 should be larger at the wide-angle end than at the telephoto end are all satisfied.

25 Claims, 15 Drawing Sheets

(Wide-angle end)

(Telephoto end)

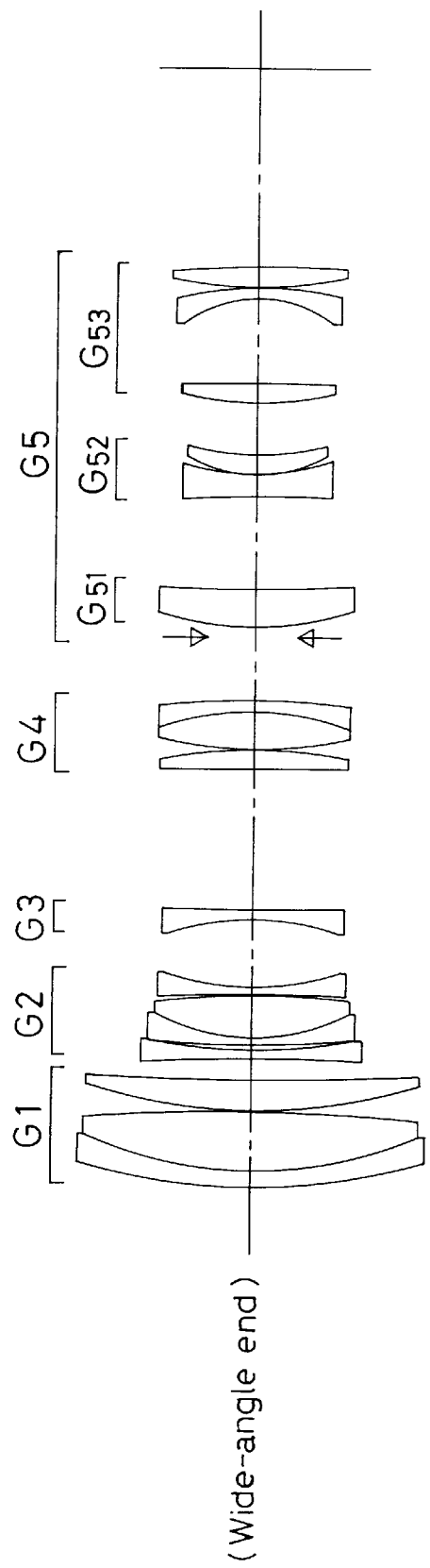
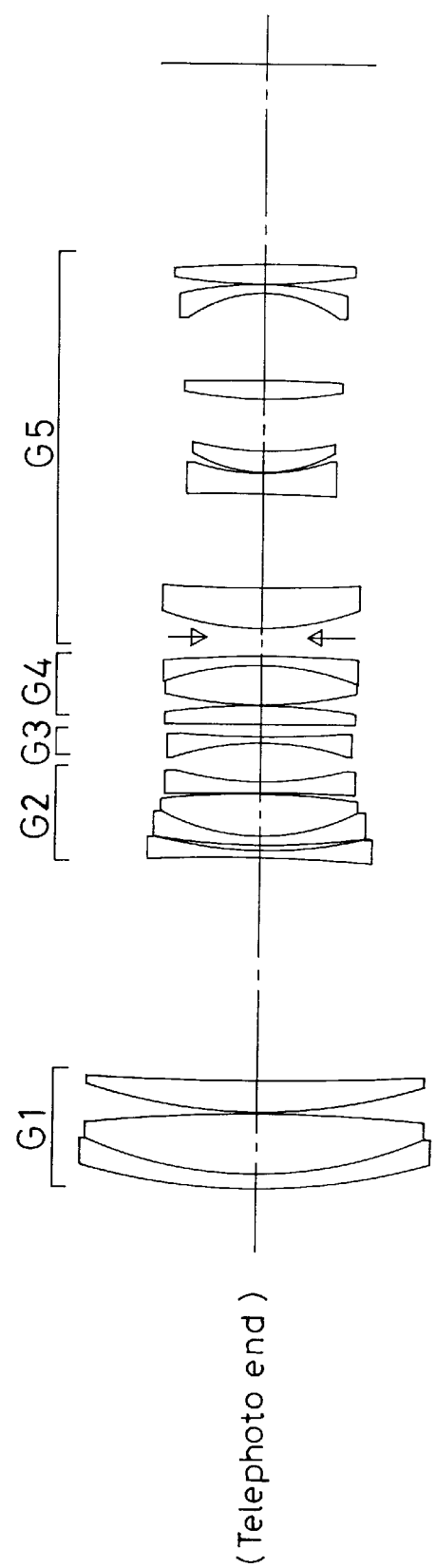
FIG. 2A (Wide-angle end)
FIG. 2B (Telephoto end)

(Wide-angle end)

(Telephoto end)

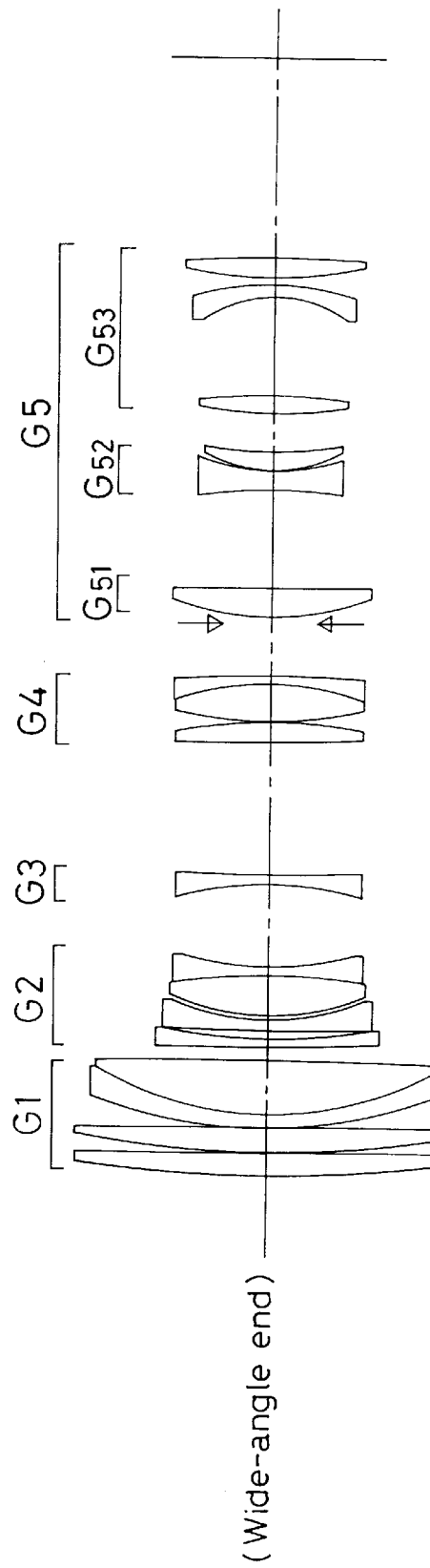
FIG. 4A (Wide-angle end)
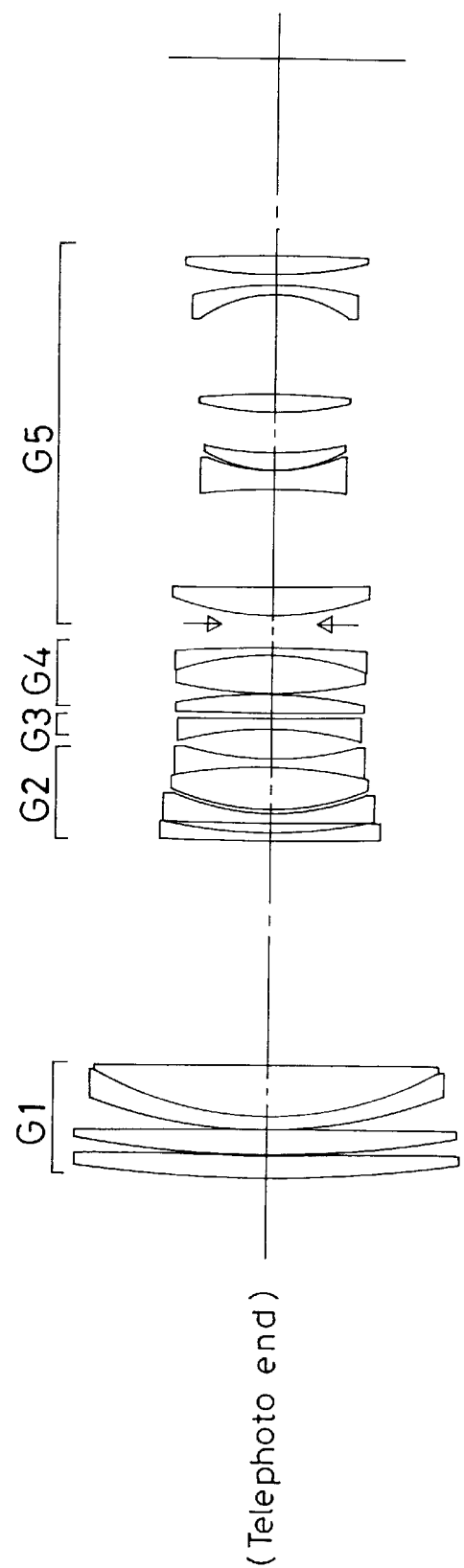
FIG. 4B (Telephoto end)

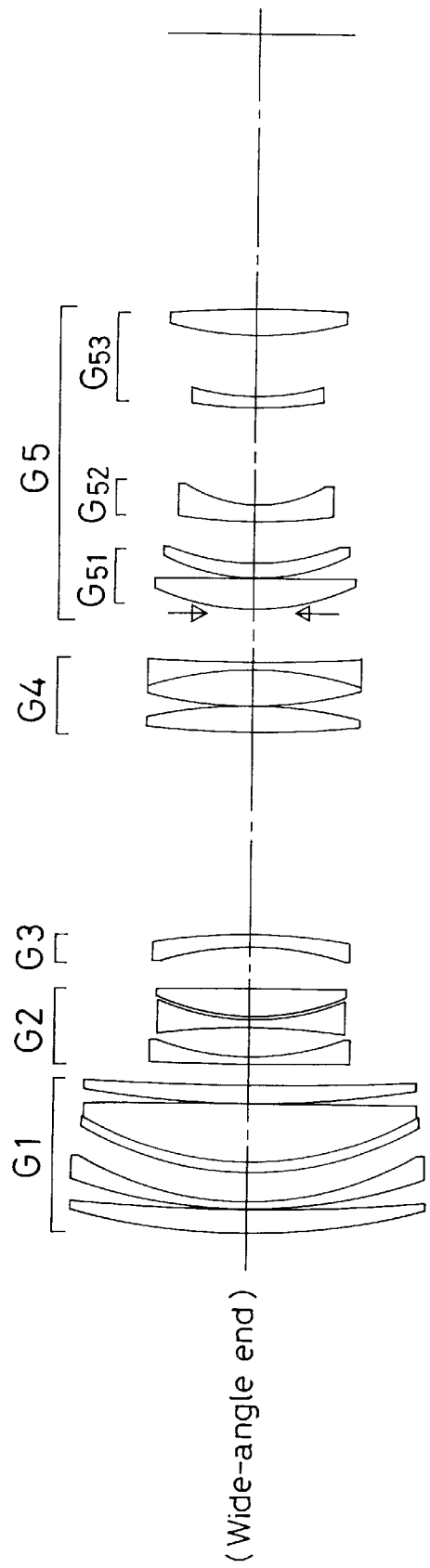
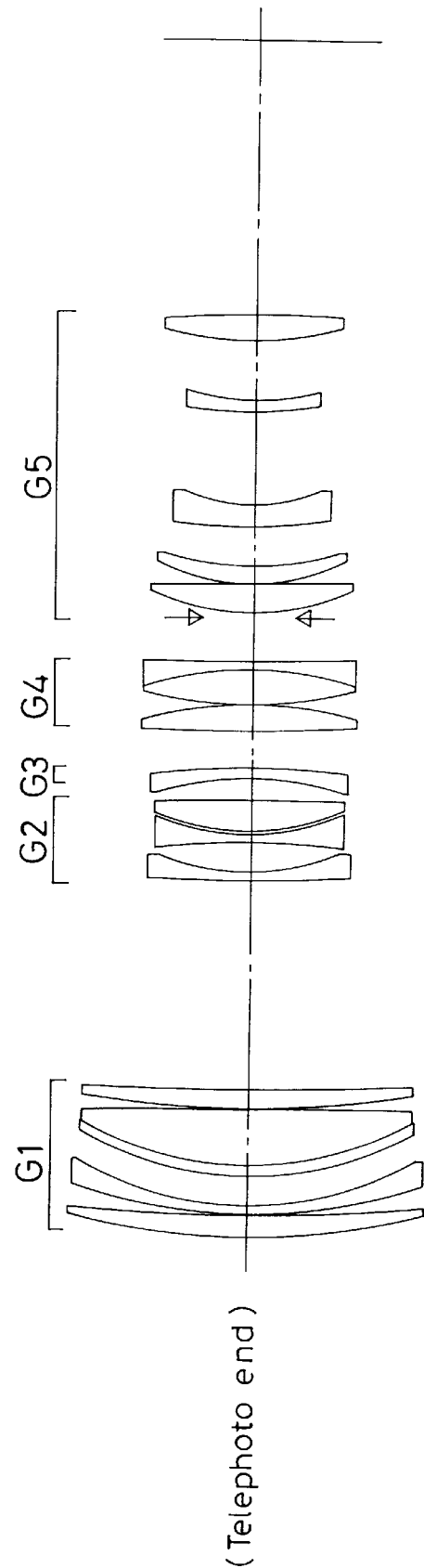
FIG. 5A (Wide-angle end)
FIG. 5B (Telephoto end)

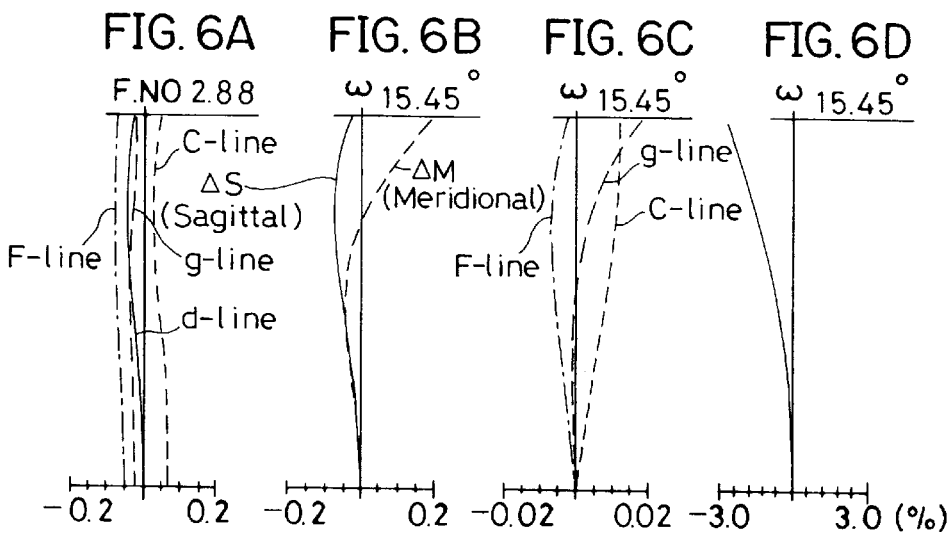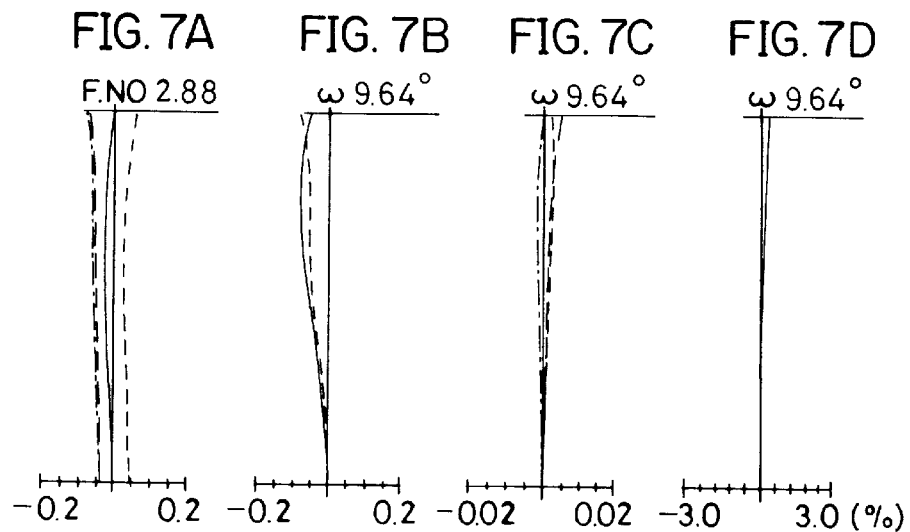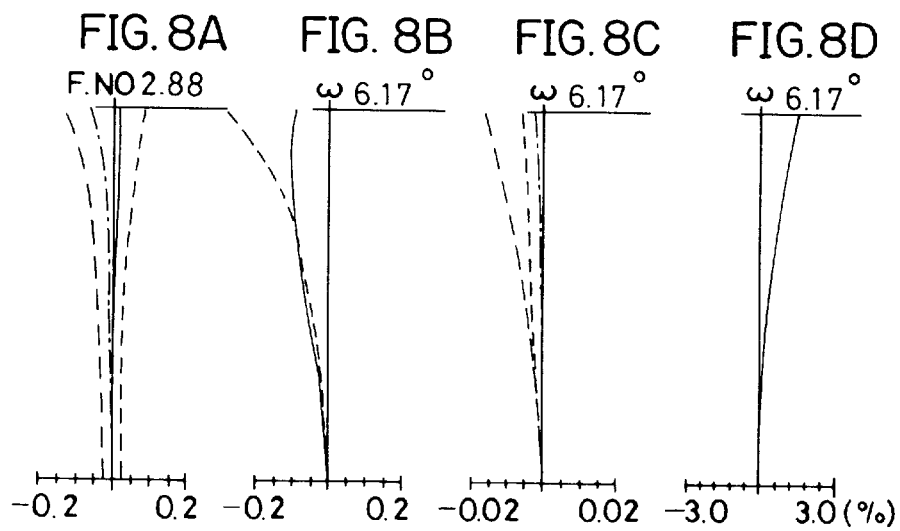

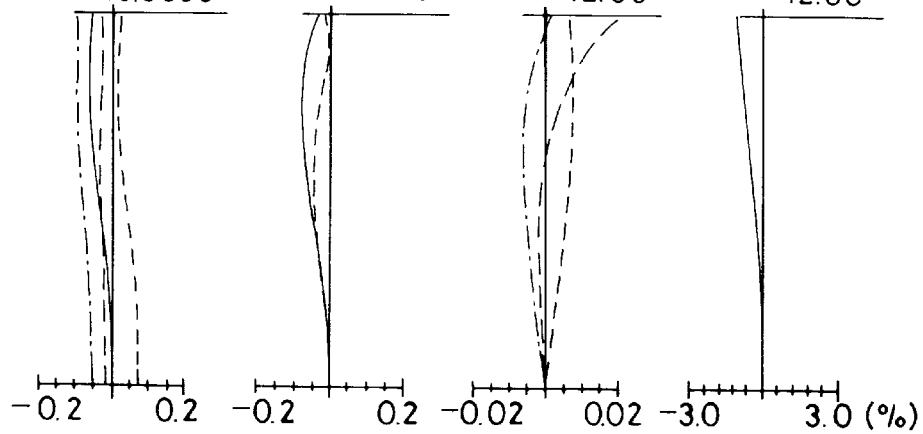

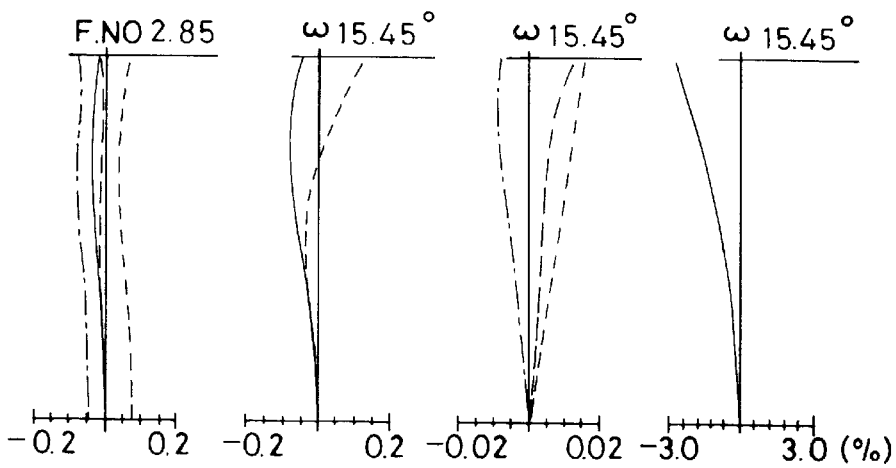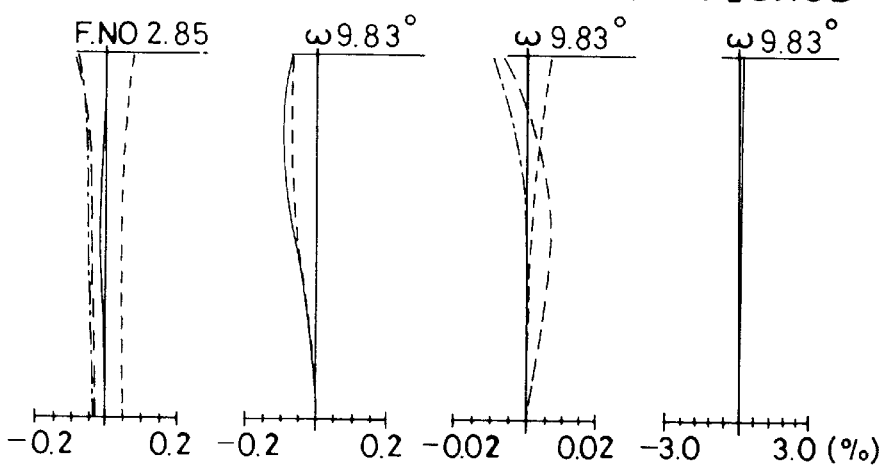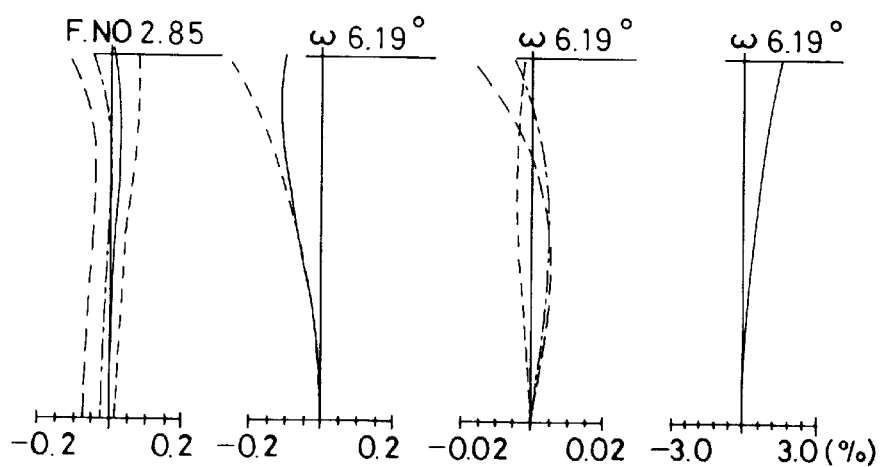

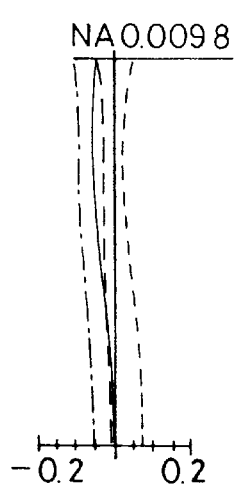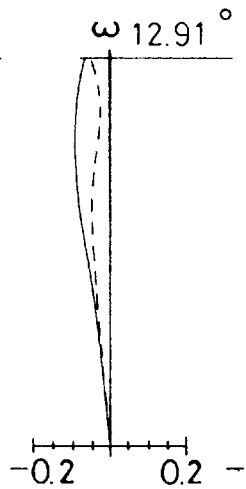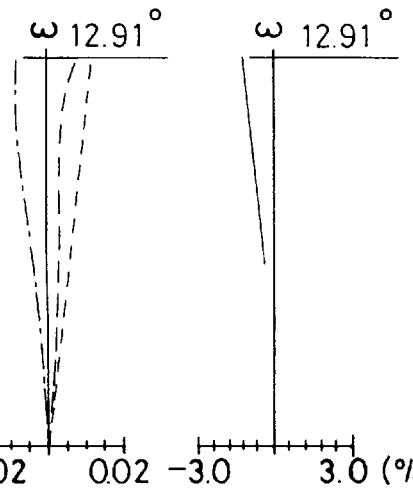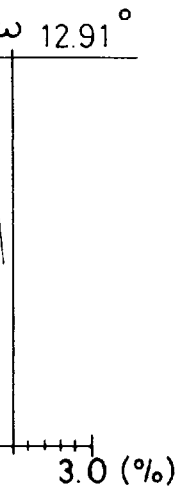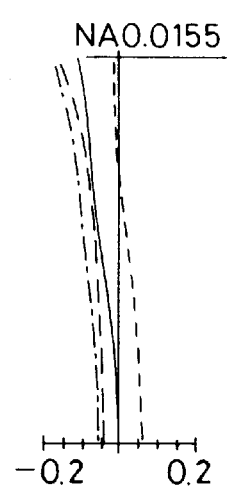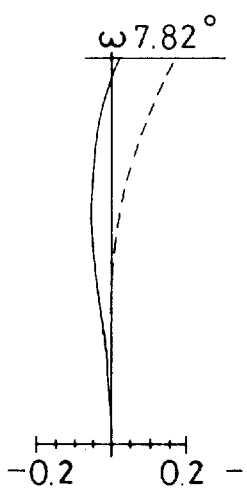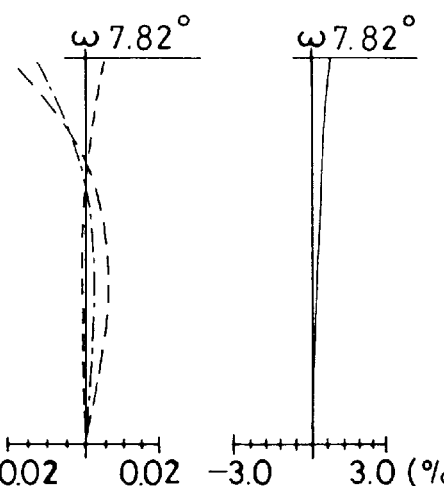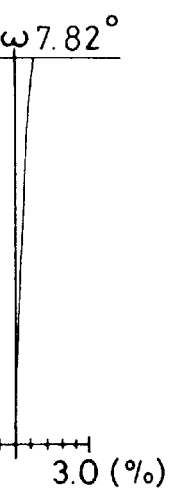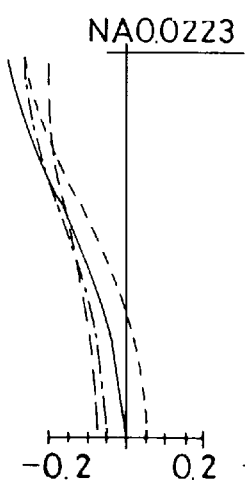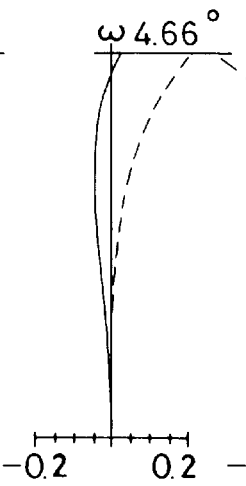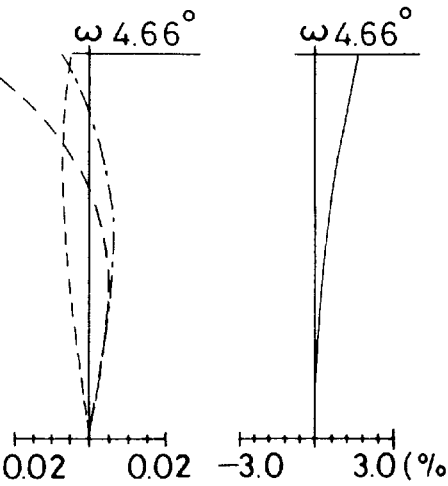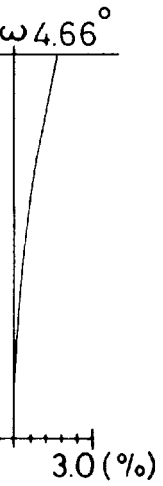

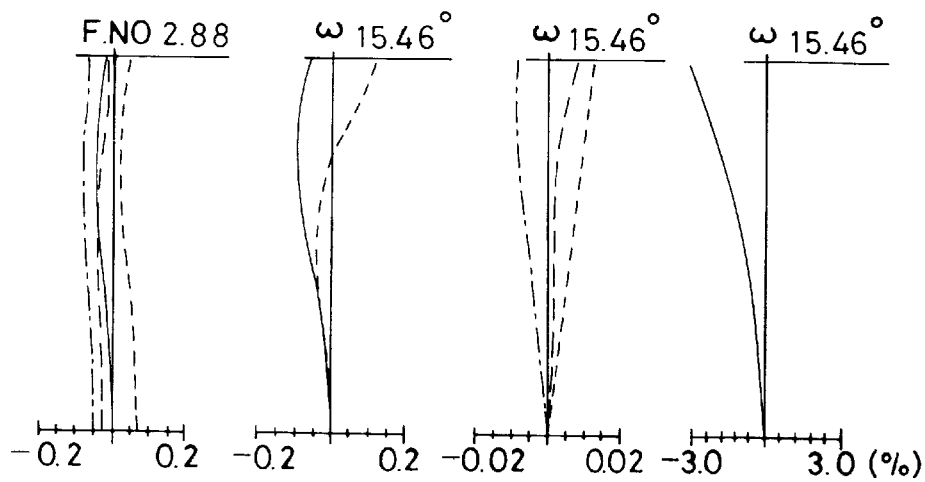
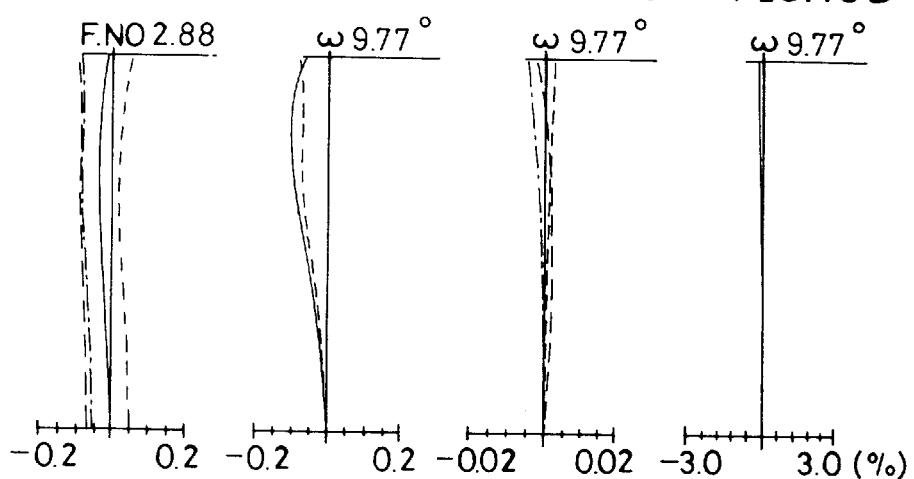
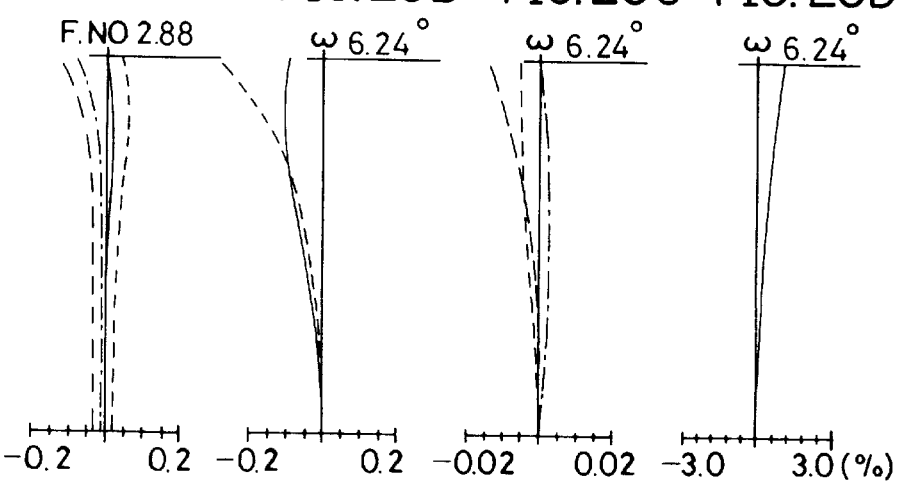

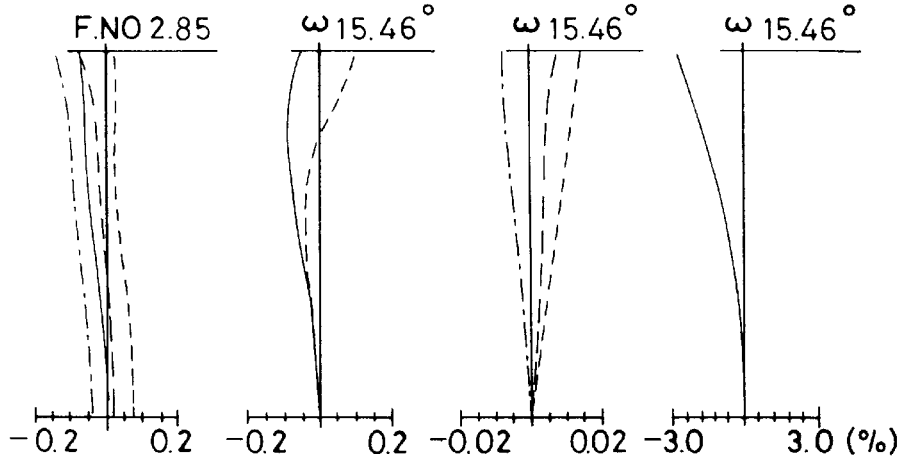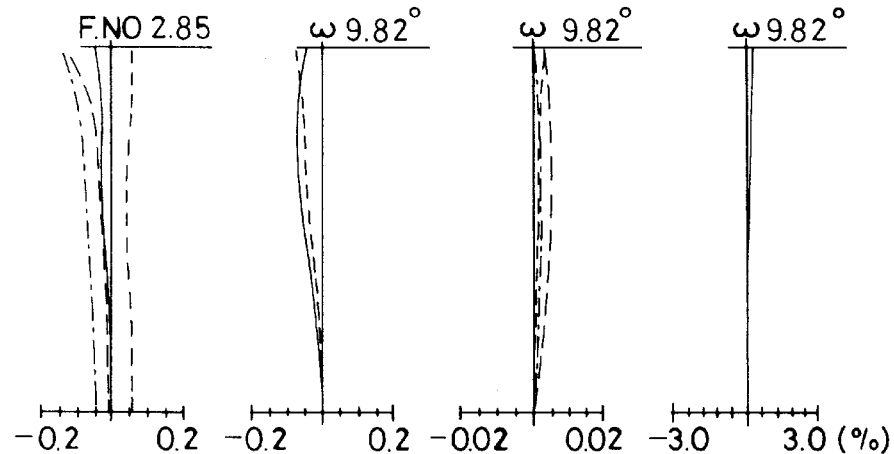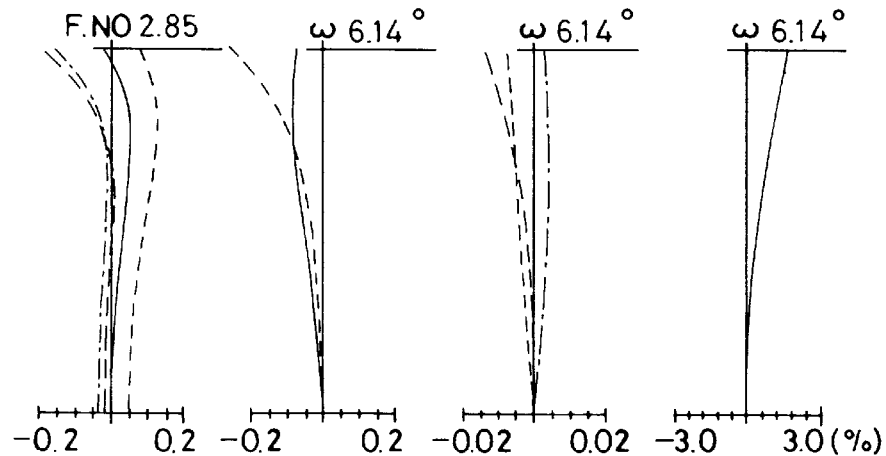

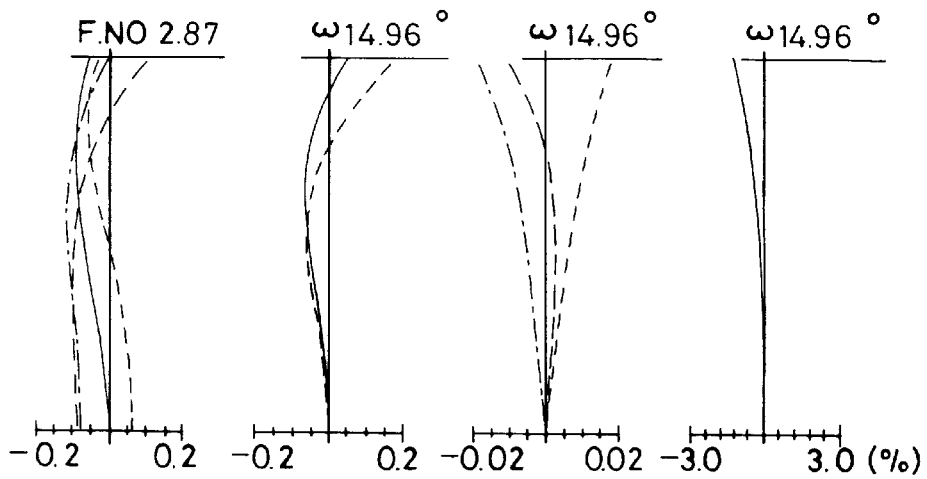
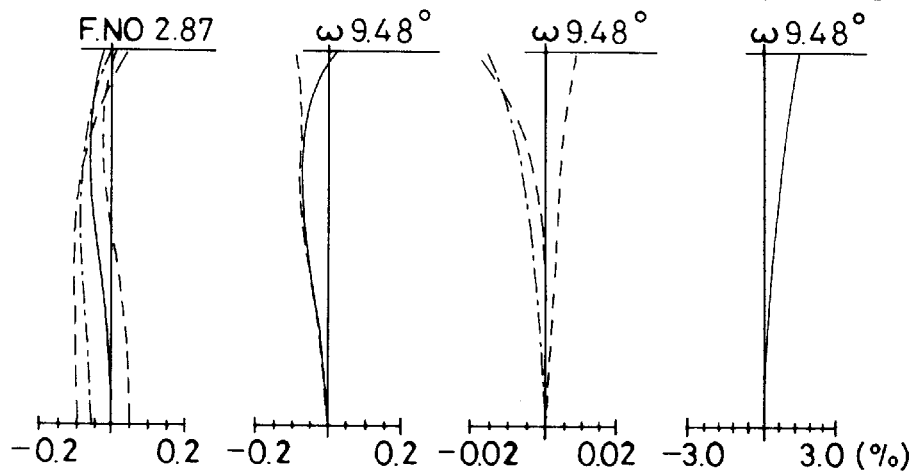
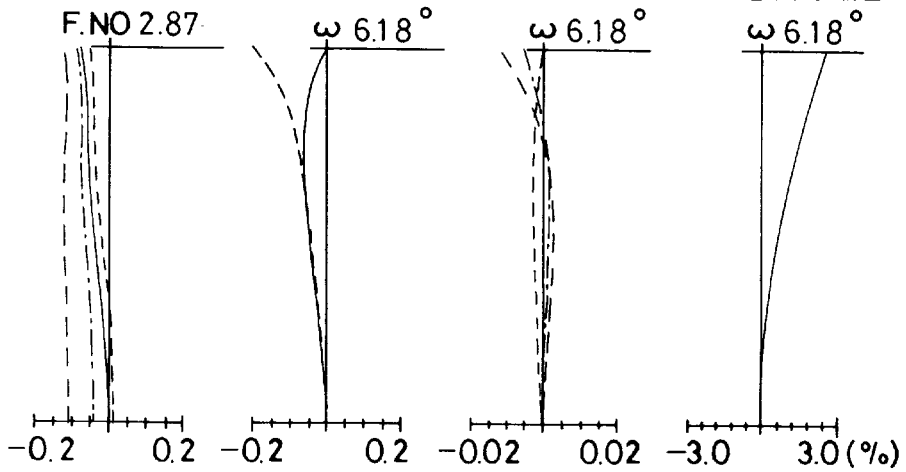

FIG. 33A    FIG. 33B    FIG. 33C    FIG. 33D
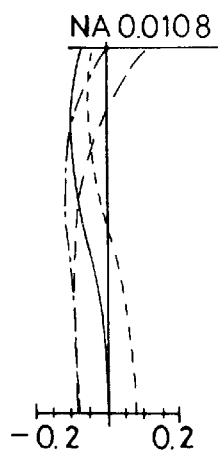 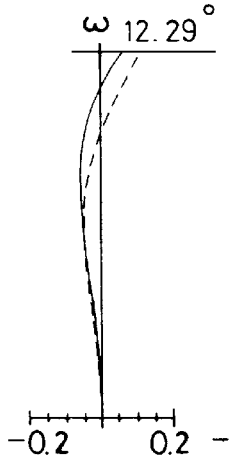 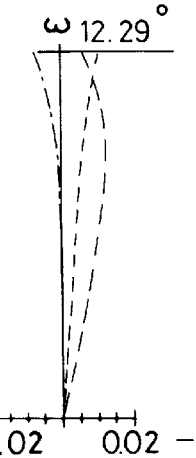 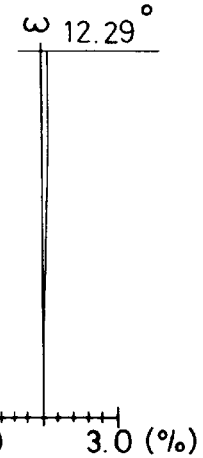
FIG. 34A    FIG. 34B    FIG. 34C    FIG. 34D
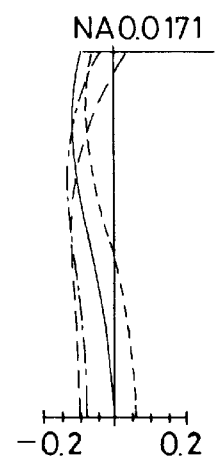 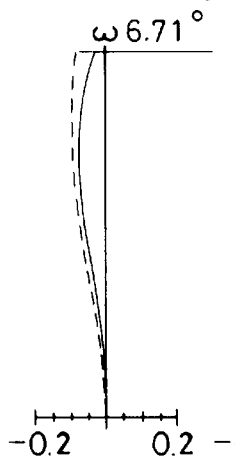 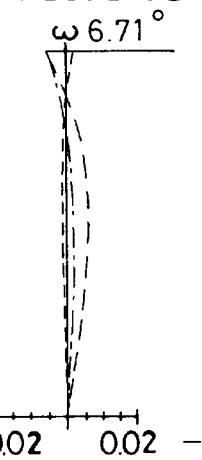 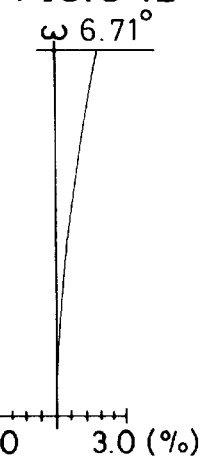
FIG. 35A    FIG. 35B    FIG. 35C    FIG. 35D
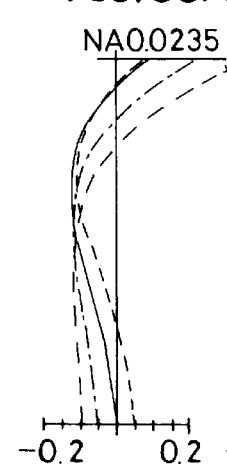 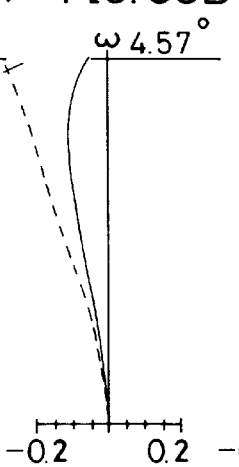 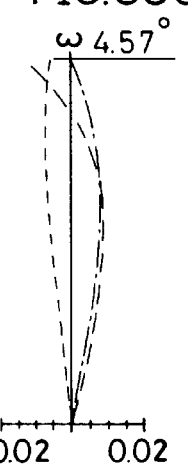 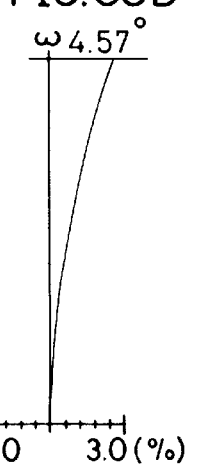

ZOOM LENS SYSTEM

BACKGROUND OF THE INVENTION

The present invention relates generally to a telephoto zoom lens, and more particularly to a telephoto zoom lens system of high image quality yet large aperture ratio.

A grave problem with a zoom lens system of large aperture ratio and with an increase quantity of center light is that it is difficult to correct various aberrations in the process wherein the quantity of light due to off-axis light flux is securely maintained to prevent a lowering of field illuminance, as is well-known in the art. For this reason, a zooming mode applicable to a zoom lens system of small aperture ratio sometimes cannot be used for making the aperture ratio large. In other words, relative aperture ratios in lens groups increase, resulting in an increase in the amount of aberrations introduced in the lens groups, and so the movement of the lens groups often gives rise to some considerable aberration variations.

The paraxial arrangement and lens configuration of a zoom lens system are considered to depend on the angle of field used. A telephoto zoom lens system of large aperture ratio, too, has some features worthy of attention. For instance, it is required to have a certain flatness of field in the wide-angle zone.

Remarkable chromatic aberration occurring in the telephoto zone must be well corrected because the state of correction thereof is linked directly with image quality.

Among zoom lens systems so far proposed in the art, those disclosed in JP-B 63-58324 and JP-A 5-215966 have gained some fame. These zoom lens systems are each made up of, in order from the object side, a first lens group having a positive refracting power, a second lens group having a negative refracting power, a third lens group having a positive refracting power and a fourth lens group having a positive refracting power; four lens groups in all. The incidental conditions are that the first, second and third lens groups constitute a substantially afocal unit and the total length of the lens system is kept constant upon focusing on the object point at infinity.

The object of these proposals is to achieve a telephoto zoom lens system of large aperture ratio. More specifically, the former, because of large aperture ratio, aims at achieving large telephoto ratio. The latter intends to eliminate or limit aberration variations during focusing. That is, an internal focusing mode due to the division of the first lens group is put forward. The internal focusing mode has some remarkable effect on correction of aberrations, but involves a problem that the lens system increases in size because it is required to allow for a separation between the focusing space and the compensating lens group.

U.S. Pat. No. 5,059,007, on the other hand, proposes to make a lens group for correction of aberration variations movable. In other words, this proposes to move the otherwise fixed image surface-compensating lens group in the form of a focusing lens group, but there is the same problem as mentioned above.

Also available is a zoom lens system basically made up of, in order from the object side, a first lens group having a positive refracting power, a second lens group having a zooming action and a negative refracting power and a third lens group having a positive refracting power and designed to correct an image surface displacement during zooming, said three groups constituting together an afocal unit, and a fourth lens group having a positive refracting power and an image-forming action. This zoom lens system is known to have stable performance and an increase in overall size as the aperture ratio becomes large.

However, paraxial constructions remain substantially unchanged while little or no improvement is introduced in the lens construction of each lens group.

Accordingly, an object of the present invention is to provide a solution to problems with the prior art modes, especially a performance problem and, hence, to provide a combined zooming and focusing mode.

In the prior art modes, there is some considerable drop of the ability to delineate images due to aberration variations upon focusing on a finite object point. One chief reason is that the third-order spherical aberration coefficient is remarkably undercorrected because the first lens group is moved toward the object side. Another possible reason is that higher-order spherical aberration coefficients of different signs are not well corrected.

To solve these problems, the internal focusing mode has been put forward, where separations between a plural lens groups are varied. For instance, in the above-mentioned lens group divided into an afocal sub-group and a positive sub-group, it is the latter positive sub-group that takes a focusing role. However, this focusing mode does not only render the configuration and weight of the lens arrangement complicate and heavy, but also offers a hard-to-solve production problem because the sensitivity of the first lens group with respect to a decentering production error due to its tilt is high.

Correction of field distortion is important for the image quality of a telephoto zoom lens system, to say nothing of correction of chromatic aberration. To make the telephoto zoom lens system of large aperture ratio compact and enhance its image quality, it is also important in view of the properties of the optical system to make use of paraxial arrangement and lens construction that enable correction of curvature of field to be easily achieved. This is because, unlike a wide-angle lens system, the optical performance of its peripheral portion is also important for delineation wherein only an extended perspective sense of depth is enhanced.

SUMMARY OF THE INVENTION

As can be seen from the foregoing explanation, an object of the present invention is to provide a telephoto zoom lens system of large aperture ratio, which is reduced in terms of aberration variations incidental to zooming and focusing, and is of high image quality as well.

According to one aspect of the present invention, the above-object is achieved by the provision of a telephoto zoom lens system consisting essentially of, in order from the object side, a first lens group having a positive refracting power, a second lens group having a negative refracting power, a third lens group having a negative refracting power, a fourth lens group having a positive refracting power and a fifth lens group having a positive refracting power, wherein, for zooming from the wide-angle zone to the telephoto zone, the second and third lens groups are moved in conformity to the following conditional inequalities while the first and fifth lens groups remain fixed, and the fourth lens group is designed to act as means for correction of an image surface position apart from said movable lens groups:

$$|\beta_{2W} \cdot \beta_{3W}| \leq |\beta_{2T} \cdot \beta_{3T}| \ldots \quad (1)$$

$$\beta_{3W} > \beta_{3T} \ldots \quad (2)$$

$$D_{2W} > D_{2T} \ldots \quad (3)$$

where $\beta_{2W}$ is the lateral magnification of the second lens group at the wide-angle end, $\beta_{2T}$ is the lateral magnification of the second lens group at the telephoto end, $\beta_{3W}$ is the lateral magnification of the third lens group at the wide-angle end, $\beta_{3T}$ is the lateral magnification of the third lens group at the telephoto end, $D_{2W}$ is the real separation between the second and third lens groups at the wide-angle end, and $D_{2T}$ is the real separation between the second and third lens groups at the telephoto end.

It is then desired that the refracting powers of the lens groups satisfy the following conditional inequalities:

$$0.2 < |\phi_1/\phi_3| < 1.5 \ldots \quad (4)$$

$$0.4 < \Phi_2/\phi_3 < 2.5 \ldots \quad (5)$$

$$0.5 < |\phi_4|\phi_3| < 2.0 \ldots \quad (6)$$

where $\phi_1$ is the refracting power of the first lens group, $\phi_2$ is the refracting power of the second lens group, $\phi_3$ is the refracting power of the third lens group, and $\phi_4$ is the refracting power of the fourth lens group.

It is also desired that the fifth lens group consist essentially of a first lens sub-group having a positive refracting power, a second lens sub-group having a negative refracting power and a third lens sub-group having a positive refracting power, and satisfy the following conditional inequalities:

$$0.4 < |\phi_5|\phi_3| < 1.5 \ldots \quad (7)$$

$$0.8 < +\phi_{51}/\phi_5 < . \ldots \quad (8)$$

$$0.5 < |\phi_{52}/\phi_{52}/\phi_5 < 2 \ldots \quad (9)$$

$$0.5 < \phi_{53}/\phi_5 < 1.5 \ldots \quad (10)$$

where $\phi_5$ is the refracting power of the fifth lens group, $\phi_{51}$ is the refracting power of the first lens sub-group of the fifth lens group, $\phi_{52}$ is the refracting power of the second lens sub-group of the fifth lens group, and $\phi_{53}$ is the refracting power of the third lens sub-group of the fifth lens group.

According to another aspect of the present invention, there is provided a telephoto zoom lens system which consists essentially of, in order from the object side, a first lens group having a positive refracting power, a second lens group having a negative refracting power, a third lens group having a negative refracting power, a fourth lens group having a positive refracting power and a fifth lens group having a positive refracting power, and in which, for zooming from the wide-angle zone to the telephoto zone, the second and third lens groups are moved in conformity with the above-mentioned conditional inequalities (1) to (3) while the first and fifth lens groups remain fixed, and the fourth lens group is moved in relation to said moving lens groups to make correction for an image surface position, characterized in that a thirdorder spherical aberration coefficient produced in the fifth lens group upon focusing on the object point at infinity is up to 1/10 of that produced in the first lens group, thereby to correct the third-order spherical aberration which varies when the first lens group is moved in the form of focusing means for an object at a finite distance.

A detailed account will now be given of why the above-mentioned constructions are used and how they act.

The telephoto zoom lens system of the present invention is generally called a quasi-telephoto type and so has an angle of field of up to about 34°. This reason depends on the relation between the manner in which the zoom lens system is moved and the position of the entrance pupil. The telephoto zoom lens system of the present invention is also designed to be of large aperture ratio.

Many zoom lens systems so far proposed in the art, which have a constant overall length and comprise positive, negative, positive and negative lens groups, have found wide use because they have stable performance due to a reduced number of moving lens groups. However, a problem with these optical systems is that curvature of field is likely to remain on the wide-angle side when they are designed to be compact. Moreover, since light flux passing through the front group becomes large on the telephoto side, there is much to be desired in terms of performance because spherical aberration variations become noticeable upon focusing from the object point at infinity to a finite object point. Consequently, one feature of the present invention is to provide an optical element that is effective to compensate for an image surface, thereby correcting the image surface and off-axis coma on the wide-angle side.

In the present invention, attention is paid to the point that the telephoto side having a narrow angle of field is largely governed by the third-order spherical aberration; that is, the phenomenon that, for instance, when focusing is done by moving the first lens group, the third-order spherical aberration is undercorrected so that the best axial image surface moves toward the object side. This phenomenon may possibly be eliminated by reducing the amount of focusing movement, and by compensating for the image surface by the occurrence of higher-order spherical aberrations.

The present invention provides satisfactory means for solving the above-mentioned problems.

The first approach is that the third lens group is movable during zooming and has a negative refracting power is provided as a means for correcting for a peripheral image surface on the wide-angle side.

Theoretically, the third-order spherical aberration in the telephoto zone is corrected by reducing the refracting power, thereby reducing the amount of focusing movement, and by introducing some modifications in lens constructions. The second approach is that there is provided means for correcting the amount of the third-order spherical aberration produced by the fifth lens group upon focusing on the object point at infinity, thereby controlling the amount of aberration variations during focusing.

More specifically, the first lens group, having a positive refracting power, is used as a focusing means while it remains fixed during zooming. The second lens group, having a negative refracting power, is designed to be almost linearly movable. The third and second lens groups are designed to move at different speeds. However, these lens groups move toward the image surface side, as viewed from the wide-angle end, for zooming from the wide-angle end to the telephoto end. The zoom ratio that these second and third lens groups bear is given by inequality (1). When inequality (1) is not satisfied, the second and third lens groups fail to function as a zooming unit; no zooming from the wide-angle end to the telephoto end takes place.

The zooming relation that the third lens group must satisfy is given by inequality (2). This relation is of significance in making correction for aberrations. When inequality (2) is not satisfied, the object of the present invention is not achieved because the effect on correction of off-axis aberrations, especially coma and curvature of field becomes insufficient.

As defined by inequality (3) in conjunction with inequality (2), the separation between the second and third lens groups should be larger at the wide-angle end than at the telephoto end. When inequality (3) is not satisfied, the problems mentioned in connection with the four-group zoom lens system arise because the effect on correction of off-axis aberrations in the wide-angle zone becomes small.

The fourth lens group having a positive refracting power is determined in terms of the magnitude of refracting power such that any change in the position of an image point induced during the zooming movement of the zooming lens groups comprising the second and third lens groups is corrected.

Furthermore in view of correction of aberrations, it is desired that the first to fourth lens groups constitute together a substantially afocal unit. If these constitute a converging unit, there is then a lowering of image quality.

In order that this zooming optical system is effective for correction of aberrations, the above-mentioned inequalities (2) and (3) should be satisfied, thereby making sufficient correction for coma in the wide-angle zone.

Inequalities (4) to (7) define the refracting powers with which the lens groups are constructed.

Inequality (4) defines the refracting power of the first lens group. Exceeding the upper limit of 1.5 is desirable for achieving compactness or reducing the amount of focusing movement, but is not preferable in the present invention because there are increases in the amount of curvature of field produced in the wide-angle zone and the amount of chromatic aberration produced in the telephoto zone. Falling below the lower limit of 0.2 is desirable for correcting aberrations, but is not preferable in the present invention because it causes an increase in the size of the lens system of large aperture ratio, and gives rise to a decrease in the quantity of marginal rays at the same time.

Inequality (5) defines the refracting power of the second lens group, and is important for placing the optical performance of the overall system in a well-balanced state. Exceeding the upper limit of 2.5 is desirable for making the zooming unit compact, but is not preferable for correcting of aberrations such as curvature of field, coma, and distortion. When the lower limit of 0.4 is not reached, it is required to reduce the refracting powers of other lens groups, and the same problems as mentioned in connection with the lower limit of inequality (4) arise.

Inequality (6) defines the refracting power of the fourth lens group having a positive refracting power. Since the fourth lens group is non-linearly moved to correct the position of an image surface produced during zooming, this condition is important for the arrangement of the optical system if the zooming space is taken into account. Falling below the lower limit of 0.5 is not preferable because the total length of the lens system increases due to an increase in the amount of zooming movement, although there is a decrease in the number of lenses involved. Exceeding the upper limit of 2.0 is not preferable because it is difficult to correct aberrations, especially spherical aberration.

Inequalities (7) to (10) define the fifth lens group having a positive refracting power, which forms an image-formation optical unit.

Inequality (7) defines the refracting power of the fifth lens group perse. To make such an optical system compact, it has often been required to increase the refracting power of the image-formation optical unit. This holds for a case where the upper limit of 1.5 is exceeded, and it is then required to increase the number of lenses forming such a unit. Falling below the lower limit of 0.4 is desirable for correcting aberrations, but is not preferable for the present invention because the overall system increases in size, and the outer diameter of the front group increases, although depending on the position of the pupil.

Inequality (8) is concerned with the group of positive refracting power, which constitutes the first lens sub-group $G_{51}$ in the fifth lens group of positive refracting power. Exceeding the upper limit of 2 is desirable for a decrease in the overall length due to an increased converging action, but is not preferable for the present invention because much difficulty is involved in the correction of spherical aberration. Falling below the lower limit of 0.8 is desirable for correcting aberrations, but is not preferable for the present invention because there is an increased aperture, which results in an increase in the size of the overall mechanism.

Inequality (9) is concerned with the group of negative refracting power, which constitutes the second lens sub-group $G_{52}$ in the fifth lens group of positive refracting power. When the upper limit of 2 is exceeded, the amount of residual aberrations becomes excessive. Falling below the lower limit of 0.5 is not preferable for the present invention because there is an increase in the total length of the fifth lens group.

Inequality (10) is concerned with the third lens sub-group $G_{53}$ of the fifth lens group. Generally, this is of negative refracting power, corresponds to a rear group constituting a telephoto type, and is of positive magnification. When the upper limit of 1.5 is exceeded, the occurrence of curvature of field and chromatic aberration of magnification becomes noticeable, leaving behind much to be desired in terms of performance. Falling below the lower limit of 0.5 is not preferable for the present invention because size problems arise as in the case of the above-mentioned inequalities (8) and (9).

Reference will here be made to how to correct a variation of spherical aberration produced in the telephoto zone when the first lens group is used as a focusing means in the present invention. Referring to a telephoto zoom lens system which consists essentially of a first lens group having a positive refracting power, a second lens group having a negative refracting power, a third lens group having a negative refracting power, a fourth lens group having a positive refracting power and a fifth lens group having a positive refracting power, and in which, for zooming from the wide-angle zone to the telephoto zone, the second and third lens groups are independently moved toward the image surface side while the first and fifth lens groups remain fixed, and the fourth lens group is moved such that it functions to correct the position of an image surface in conjunction with said movable lens groups, the third-order spherical aberration coefficient produced in the fifth lens group is reduced to up to 1/10 of the third-order spherical aberration coefficient produced in the first lens group upon focusing on the object point at infinity, so that it is possible to correct the third-order spherical aberration that varies when the first lens group is moved as a focusing means for focusing it on a finite object point.

A detailed account will now be given of illustrative thick lens constructions of the telephoto zoom lens system according to the present invention and focusing methods, inclusive of aberrations.

The telephoto zoom lens system of the present invention is an optical system which has a coverage angle of field of at least about 34° at the wide-angle end, i.e., covers a region from the quasi-telephoto zone to the telephoto zone. In other words, this lens system is not applicable to a wide-angle type of zoom lens system having an angle of field of up to about 63° at the wide-angle end.

The zoom lens system of the present invention remains unchanged in terms of the total length thereof over a region from the wide-angle end to the telephoto end upon focusing on the object point at infinity. However, the total length thereof may in some cases change during focusing.

Typical one lens construction is illustrated in FIG. 1

Example 1

Usually, the first lens group G1 moves during focusing. This lens group is made up of at least one positive lens and a set of doublets. The first lens group G1 yields negative spherical aberration and astigmatism, and positive coma as well. The amount of the aberrations produced increases on the telephoto side. Consequently, the optimum shape of this lens group is determined while its combination with the following lens group is taken into account. It is also desired to limit the amount of residual aberrations because it is difficult to correct higher-order aberrations with the rear lens group.

The second lens group G2 should be made up of at least two negative lenses and one single lens. For correction of chromatic aberration, it is also desirable to incorporate a set of doublets in the second lens group. Furthermore, when it is difficult to correct curvature of field in the wide-angle zone, it is preferable to locate a negative lens on the surface proximate to the image surface side.

The movable third lens group G3 moves in the same direction as the second lens group G2 but at different speeds during zooming. Thus, since they resemble each other in correction of aberrations but yield varying amounts of aberrations, they give rise to a floating effect, which in turn enables correction of an image surface—which is relatively difficult even in the case of a zoom lens—to be easily achieved.

The second lens group G2 yields positive spherical aberration and astigmatism, and much coma at the telephoto end. On the infinitely distant object point at the telephoto end, the second lens group G3 yields the third-order spherical aberration at an amount of up to ⅓ of that which the second lens group G2 yields. For the first lens group G1 positive distortion is corrected. Thus, the third lens group G3 may be said to share the correcting action of the second lens group G2.

The fourth lens group G4 should have at least one set of doublets. For a telephoto zoom lens system of large aperture ratio, it is desired to allocate part of refracting power to an additionally provided positive lens in view of a burden placed on correction of spherical aberration, as will be seen from the examples of the present invention. Negative third-order spherical aberration, coma and astigmatism are produced. It is particularly required to produce the negative third-order spherical aberration because the coma is produced in large amounts and so overcorrected. In other words, the coma is corrected by a combination of the fourth and fifth lens groups G4 and G5.

The fifth lens group G5 is constructed from a front sub-group of positive refracting power and a rear sub-group of a specific positive magnification and negative refracting power. For the front sub-group it is desired to increase the refracting power to make the telephoto ratio so large that the converging action can be enhanced. In view of correction of aberrations, however, some limitation is imposed on increasing the refracting power, as in the case where the positive magnification of the rear sub-group is increased. The front sub-group should have positive and negative lenses, at least one for each. The rear sub-group, which is required to have action on correction of an image surface also should have positive and negative lenses, at least one for each. Additional location of a positive lens in the rear of the front sub-group enables a lowering of the quantity of marginal rays to be reduced. The amount of the third-order aberrations produced is characterized by being kept substantially constant at an object point anywhere from the wide-angle end to the telephoto end.

An account will now be given of focusing according to the present invention.

According to the present invention, focusing is done by the movement of the first lens group G1. As already noted, however, an axial bundle becomes large in the vicinity of the telephoto end, resulting in an increase in the sensitivity to the variation of spherical aberration. Thus, the prior art optical systems are characterized in that the amount of the third-order spherical aberration produced upon focused on a nearby object point is too large for good correction. According to the present invention, this problem can be solved by reducing aberration variations without adding any compensating lens to the first lens group or using any internal focusing mode.

According to the present invention, this is achieved by reducing the amount of aberrations produced by the first lens group perse and inhibiting the variation of the third-order spherical aberration by making use of the action of the fifth lens group that is a fixed group. This is more easily achieved if the focal distance lies in the vicinity of the telephoto end. Set out below in Table 1 are the spherical aberration coefficients of the lens groups of Example 1, to be described later, at the telephoto end.

TABLE 1

| | Third-order spherical aberration coefficient | | | Fifth-order spherical aberration coefficient | |
|---|---|---|---|---|---|
| | ∞ | 1.7 m | | ∞ | 1.7 m |
| 1st group | −0.26496 | −0.30637 | 1st group | 0.00035 | 0.01407 |
| 2nd group | 0.04132 | 0.04108 | 2nd group | −0.02311 | −0.02059 |
| 3rd group | 0.31763 | 0.31574 | 3rd group | 0.01709 | 0.01774 |
| 4th group | −0.08118 | −0.08070 | 4th group | 0.00889 | 0.01304 |
| 5th group | −0.01294 | −0.01286 | 5th group | 0.00004 | −0.00238 |
| Σ | −0.00012 | −0.04311 | Σ | 0.00318 | 0.02189 |

| | Seventh-order spherical aberration coefficient | |
|---|---|---|
| | ∞ | 1.7 m |
| 1st group | 0.00251 | 0.00805 |
| 2nd group | −0.00494 | −0.00567 |
| 3rd group | 0.00164 | 0.00279 |
| 4th group | 0.00277 | 0.00081 |
| 5th group | −0.00209 | −0.00134 |
| Σ | −0.00011 | 0.00464 |

As shown in Table 1, the amount of the change in the third-order spherical aberration coefficient from the object point at infinity to a finite object point is dominant. As in Example 1, higher-order spherical aberrations of different signs are produced to set off the change in the third-order spherical aberration coefficient, so that the aberration variation throughout the overall system can be controlled.

The present invention will now be compared with a typical prior art example.

Similar spherical aberration coefficients exemplified in JP-A 62-108218 were found by calculation. The results are shown in Table 2.

TABLE 2

|  | Third-order spherical aberration coefficient | | Fifth-order spherical aberration coefficient | |
| --- | --- | --- | --- | --- |
|  | ∞ | 1.7m |  | ∞ | 1.7m |
| 1st group | −0.35797 | −0.46396 | 1st group | −0.02039 | −0.02992 |
| 2nd group | 0.54978 | 0.55381 | 2nd group | 0.00199 | 0.00488 |
| 3rd group | −0.09068 | −0.09134 | 3rd group | 0.00988 | 0.02017 |
| 4th group | −0.08867 | −0.08932 | 4th group | 0.00196 | 0.00501 |
| Σ | 0.01246 | −0.09082 | Σ | −0.01047 | −0.00988 |

|  | Seventh-order spherical aberration coefficient | |
| --- | --- | --- |
|  | ∞ | 1.7m |
| 1st group | −0.00046 | −0.00080 |
| 2nd group | −0.00512 | −0.00338 |
| 3rd group | 0.00533 | 0.00563 |
| 4th group | −0.00053 | −0.00114 |
| Σ | −0.00078 | 0.00030 |

The third-order spherical aberration produced in this prior art example is larger than that of the present invention in terms of the absolute value on the object point at infinity, and insofar as the insides of the lens groups are concerned, it is obvious that the third-order spherical aberration coefficient produced in the final lens group is very large. Set out in Table 3 are the values of the third-order spherical aberration coefficients produced in the final lens groups of Example 1 of the present invention and the prior art example at the telephoto ends.

TABLE 3

| Example 1 | | Prior Art Example | |
| --- | --- | --- | --- |
| | ∞ | | ∞ |
| 1 | −0.143 | 1 | −0.25419 |
| 2 | −0.06858 | 2 | −0.05242 |
| 3 | 0.13017 | 3 | 0.00648 |
| 4 | 0.211 | 4 | 0.1776 |
| 5 | −0.44837 | 5 | −0.34336 |
| 6 | −0.00059 | 6 | 0 |
| 7 | 0.00120 | 7 | 0.31069 |
| 8 | −0.10543 | 8 | 0.14276 |
| 9 | 0.47741 | 9 | −0.00038 |
| 10 | −0.02762 | 10 | −0.07555 |
| 11 | 0.00023 | | |
| 12 | −0.03936 | | |
| Σ | −0.01294 | Σ | −0.08867 |

The third-order spherical aberration coefficients of the first and fifth lens groups of Examples 1 to 5 of the present invention at the telephoto end upon focused on the object point at infinity are set out in Table 4.

TABLE 4

| Example | First lens group | Fifth lens group | A |
| --- | --- | --- | --- |
| 1 | −0.26496 | −0.01294 | 0.049 |
| 2 | −0.27933 | −0.02358 | 0.084 |
| 3 | −0.24971 | −0.00263 | 0.011 |
| 4 | −0.29439 | −0.01339 | 0.046 |
| 5 | −0.27137 | −0.07736 | 0.285 |

$A = SA_5/SA_1$ where $SA_1$ is the third-order spherical aberration coefficient of the first lens group on the object point at infinity, and $SA_5$ is the third-order spherical aberration coefficient of the fifth lens group on the object point at infinity.

Except Example 5, the values of A is 1/10 or lower. In Example 5, however, a so-called floating mode is used, wherein the first lens group G1 is divided into front and rear sub-groups during focusing and the first lens group G1 is moved while the separation between the sub-groups is varied; that is, Example 5 does not rely upon the focusing mode carried out only by use of the first lens group G1. In other words, Example 5 is directed to one where the value of A exceeding about 1/10 is compensated for by the above-mentioned floating.

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be indicated in the claims.

BRIEF DESCRIPTION OF THE DRAWINGS

FIGS. 2A and 2B are sectional views of Example 2, similar to those of FIGS. 1A and 1B, FIGS. 3A and 3B are sectional views of Example 3, similar to those of FIGS. 1A and 1B, FIGS. 4A and 4B are sectional views of Example 4, similar to those of FIGS. 1A and 1B, FIGS. 5A and 5B are sectional views of Example 5, similar to those of FIGS. 1A and 1B, FIGS. 6A and 6D are aberration diagrams of Example 1 at the wide-angle end upon focusing on the object point at infinity, FIGS. 7A–7D are aberration diagrams of Example 1 at an intermediate focal distance upon focusing on the object point at infinity, FIGS. 8A–8D are aberration diagrams of Example 1 at the telephoto end upon focusing on the object point at infinity, FIGS. 9A–9D are aberration diagrams of Example 1 at the wide-angle end upon focusing on a finite object point, FIGS. 10A–10D are aberration diagrams of Example 1 at an intermediate focal distance upon focusing on a finite object point, FIGS. 11A–11D are aberration diagrams of Example 1 at the telephoto end upon focusing on a finite object point, FIGS. 12A–12D are aberration diagrams of Example 2 at the wide-angle end upon focusing on the object point at infinity, FIGS. 13A–13D are aberration diagrams of Example 2 at an intermediate focal distance upon focusing on the object point at infinity, FIGS. 14A–14D aberration diagrams of Example 2 at the telephoto end upon focused on the object point at infinity, FIGS. 15A–15D aberration diagrams of Example 2 at the wide-angle end upon focusing on a finite object point, FIGS. 16A–16D are aberration diagrams of Example 2 at an intermediate focal distance upon focusing on a finite object point, FIGS. 17A–17D are aberration diagrams of Example 2 at the telephoto end upon focusing on a finite object point, FIGS. 18A–18D aberration diagrams of Example 3 at the wide-angle end upon focusing on the object point at infinity, FIGS. 19A–19D are aberration diagrams of Example 3 at an intermediate focal distance upon focusing on the object point at infinity, FIGS. 20A–20D are aberration diagrams of Example 3 at the telephoto end upon focusing on the object point at infinity, FIGS. 24–24D are aberration diagrams of Example 4 at the wide-angle end upon focusing on the object point at infinity, FIGS. 25A–25D are aberration diagrams of Example 4 at an intermediate focal distance upon focusing on the object point at infinity, FIGS. 26A–26D are aberration diagrams of Example 4 at the telephoto end upon focusing on the object point at infinity, FIGS. 30A–30D are aberration diagrams of Example 5 at the wide-angle end upon focusing on the object point at infinity, FIGS. 31A–31D are aberration diagrams of Example 5 at an intermediate focal distance upon focusing on the object point at infinity, FIGS. 32A–32D are aberration diagrams of Example 5 at the telephoto end upon focusing on the object point at infinity, FIGS. 33A–33D are aberration diagrams of Example 5 at the wide-angle end upon focusing on a finite object point, FIGS. 34A–34D are aberration diagrams of Example 5 at an intermediate focal distance upon focusing on a finite object point, and FIGS. 35A–35D are aberration diagrams of Example 5 at the telephoto end upon focusing on a finite object point.

DESCRIPTION OF THE PREFERRED EMBODIMENTS

The telephoto zoom lens system of the present invention will now be explained more specifically with reference to Examples 1 to 5. Numerical data on each example will be given later.

Example 1 is directed to a zoom lens system which has a coverage angle of field of 30.08° to 12.53° from the wide-angle end to the telephoto end, and is of an aperture ratio as large as 1:2.875.

Figure 1A:
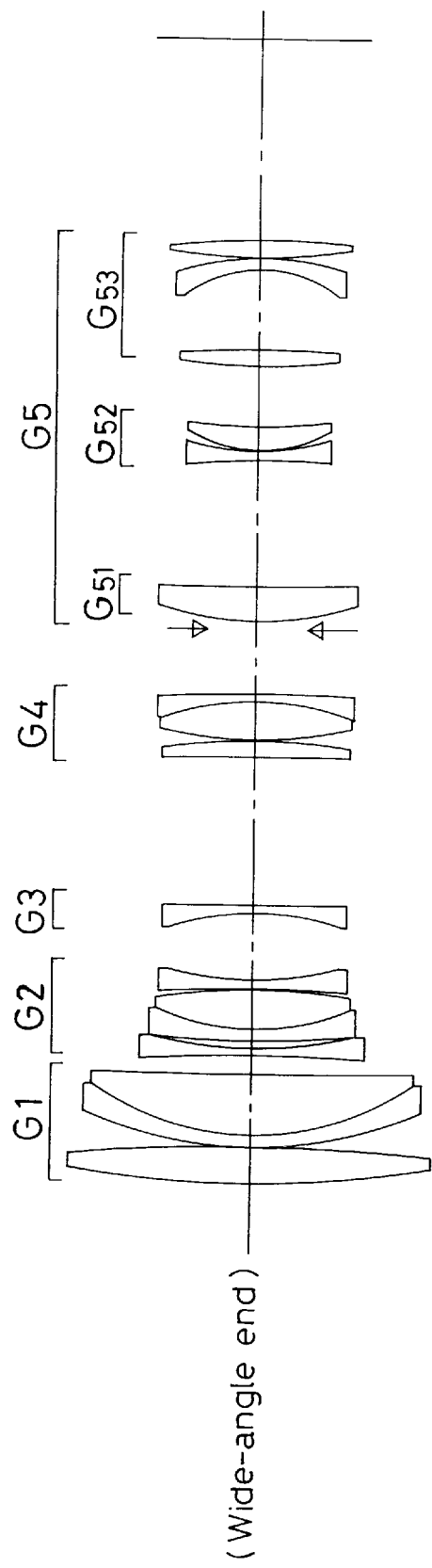
FIGS. 1A and 1B illustrate in section lens arrangements of Example 1 of the telephoto zoom lens system according to the present invention at the wide-angle and telephoto ends respectively.
Figure 1B:
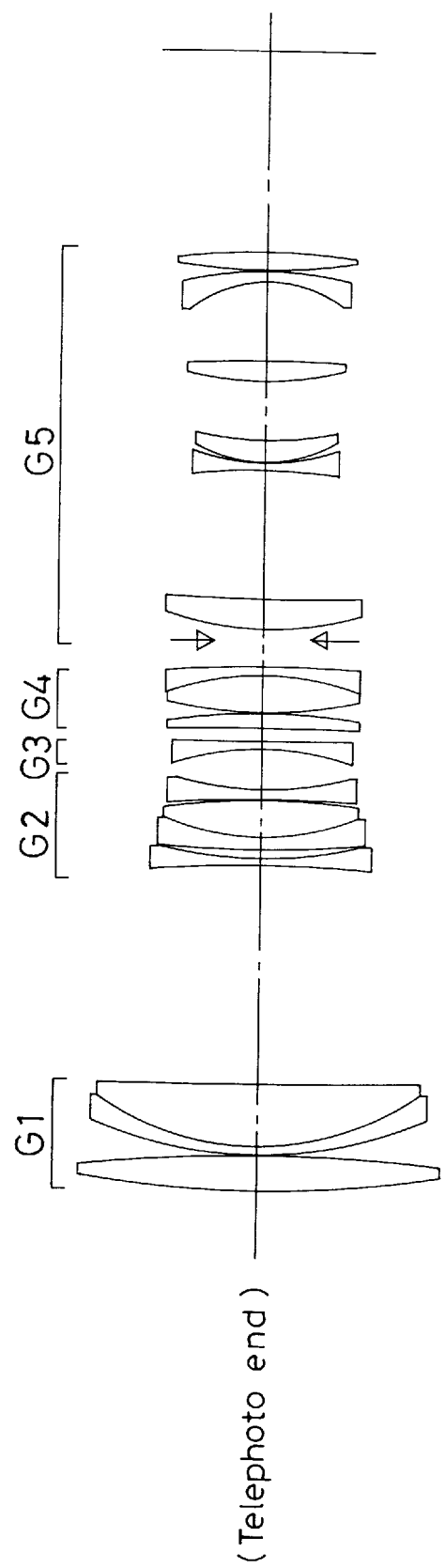

Sectional lens arrangements of this example at the wide-angle and telephoto ends are shown in FIGS. 1A and 1B, respectively. Aberration diagrams representing the performance of Example 1 at the wide-angle end, an intermediate focal distance and the telephoto end upon focused on the object point at infinity are illustrated in FIGS. 6A–8D, and aberration diagrams representing the performance of Example 1 at the wide-angle end, an intermediate focal distance and the telephoto end upon focused on a finite object point of about 1.7 m are illustrated in FIGS. 9A–11D. Throughout the aberration diagrams, A, B, C and D stand for spherical aberration, astigmatism, chromatic aberration of magnification and distortion, respectively.

Features of the lens arrangement of Example 1 are as follows.

The first lens group G1 consists of a single positive lens and a doublet. In this doublet, a negative meniscus lens convex on the object side is cemented to a positive lens. This construction is effective for achieving a small telephoto ratio. In Example 1 it is desirable to use anomalously dispersing glass to correct secondary spectra, because it is difficult to correct chromatic aberration produced by the first lens group G1 by the rear lens groups.

The second lens group G2 consists of a negative lens, a doublet and a double-concave negative lens. This doublet consists of a negative meniscus lens convex on the object side and a double-convex lens. Example 1 may be achieved even without recourse to any final double-concave negative lens. However, it is preferable to use the final double-concave negative lens to achieve flatness of field. An air lens between the above-mentioned doublet and the following double-concave negative lens enables higher-order aberrations to be produced and offset each other, so making a contribution to obtaining high image quality.

The third lens group G3 consists of a single negative meniscus lens concave on the object side. This lens group exercises a profound effect in the wide-angle zone where the occurrence of curvature of field becomes noticeable, and is characterized by enhancing the action of a field flattener. This single lens type group is required to correct chromatic aberration. However, if the zooming space is taken into account, it is then desired that the number of lenses forming this group be as much reduced as possible; if the end image quality is ensured throughout the entire construction of the system, it is then desired that the third lens group G3 consist of a single lens.

The fourth lens group G4, which may also be called a compensator, is designed to move non-linearly. However, correction of chromatic aberration is required because its refracting power becomes relatively large. This is the reason the fourth lens group G4 consists of a single positive lens and a set of doublets.

The fifth lens group G5 is required to constitute an image-formation unit which takes a general form of fixed focus lens unit. When it is intended to obtain high image quality with a simple structure, the total length of this group increases. It is therefore necessary that the fifth lens group G5 constitutes a telephoto type with the principal point located at a front position of the optical system. In Example 1, the fifth lens group G5 is made up of, in order from the object side, a front sub-group consisting of a single positive lens having an increased refracting power, and an intermediate sub-group or a doublet consisting of a negative lens and a positive meniscus lens so that a well-balanced compromise can be made between correction of aberration variations caused by the first lens group G1 during focusing and the performance of the fifth lens group G5 per se. The fifth lens group G5 further includes a rear sub-group consisting of a positive lens designed to have a converging action on off-axis light flux, a negative meniscus lens greatly concave on the object side and a positive lens.

Referring here to the movement of the optical system, the second and third lens groups G2 and G3 are designed to move in the same direction yet at different speeds while the fourth lens group G4 is designed to move non-linearly so as to correct a change in the image surface position caused by the movement of the second and third lens groups G2 and G3.

An account will now be given of the state of correction of aberrations throughout the optical system. As can be seen from FIGS. 6A–11D, the telephoto zoom lens system of large aperture ratio according to Example 1 shows very stable aberrations. In some cases, however, there is a somewhat increase in the spherical aberration variation at the telephoto end during focusing, as can be appreciated from FIG. 11A. As already explained, this variation cannot be corrected without recourse to special correcting means, because if focusing is done by the movement of the first lens group G1, it is largely governed by a variation of the third-order spherical aberration. According to Example 1, therefore, the intermediate sub-group is incorporated in the fifth lens group G5 to intentionally generate higher-order spherical aberrations, so that the object of the present invention can be accomplished without recourse to any internal focusing mode.

Example 2, almost similar in lens design to Example 1, is directed to a telephoto zoom lens system having a coverage angle of 30.08° to 12.56° and an aperture ratio of 1:2.85.

Example 2 is the same as Example 1 with the exception that the first lens group G1 is made up of a doublet consisting of a negative meniscus lens and a positive lens, and a positive lens, as can be seen from the sectional views of FIGS. 2A and 2B.

Aberration diagrams representing the performance of Example 2 at the wide-angle end, an intermediate focal distance and the telephoto end upon focusing on the object point at infinity are shown in FIGS. 12–14, and aberration diagrams representing the performance of Example 2 at the wide-angle end, an intermediate focal distance and the telephoto end upon focused on a finite object point of about 1.7 m are shown in FIGS. 15A–17D.

Figure 3A:
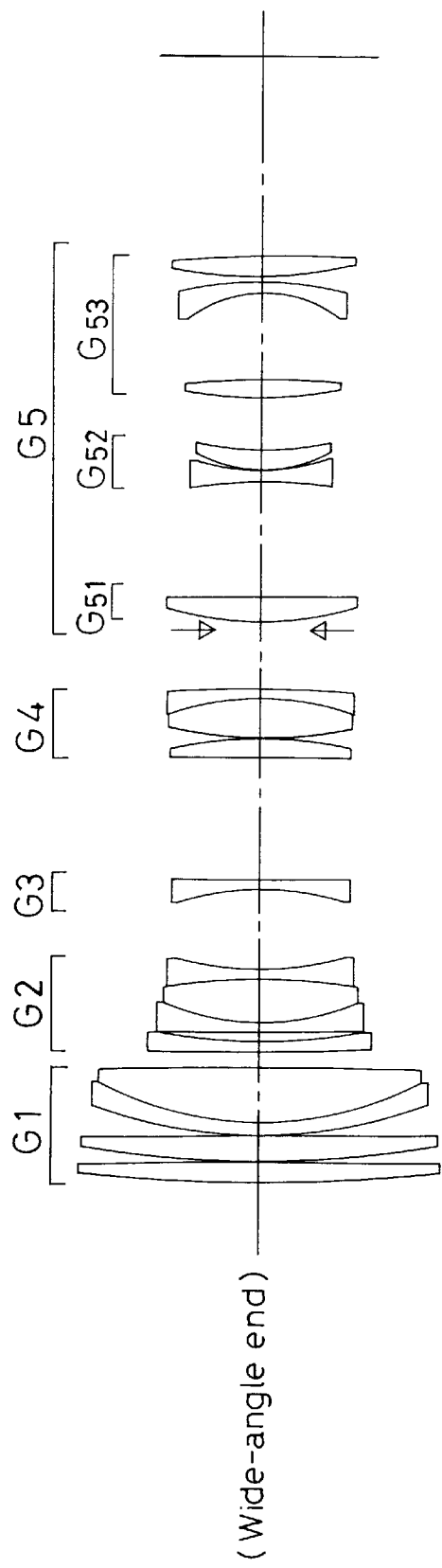
Figure 3B:
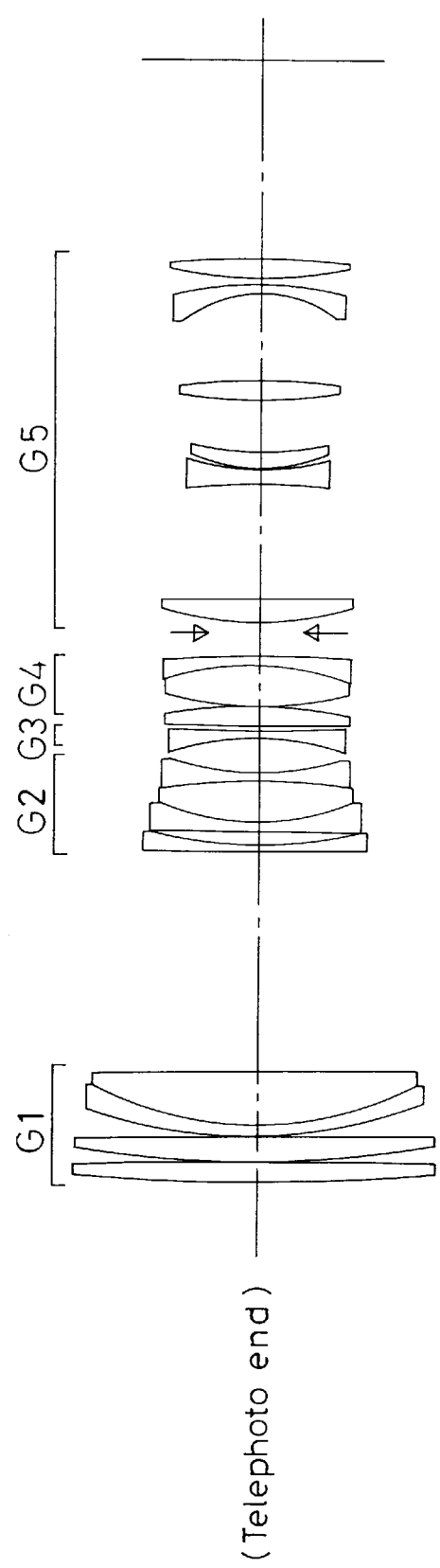
Figure 21A:
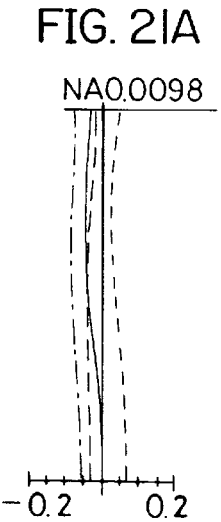
FIGS. 21A–21D is aberration diagrams of Example 3 at the wide-angle end upon focusing on a finite object point, FIGS. 22A–22D aberration diagrams of Example 3 at an intermediate focal distance upon focusing on a finite object point, FIGS. 23A–23D aberration diagrams of Example 3 at the telephoto end upon focusing on a finite object point.
Figure 21B:
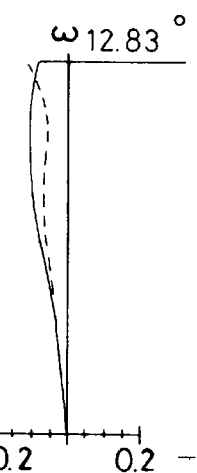
Figure 21C:
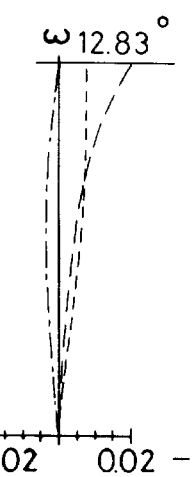
Figure 21D:
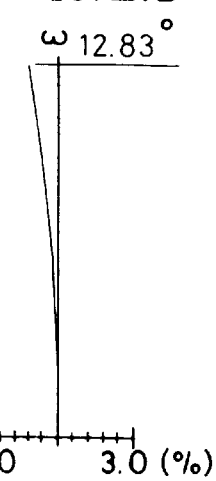
Figure 22A:
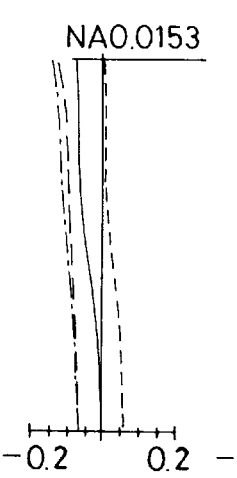
Figure 22B:
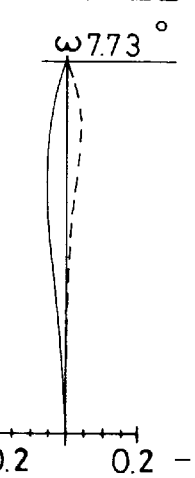
Figure 22C:
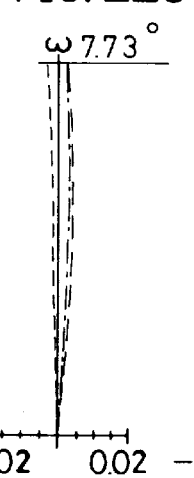
Figure 22D:
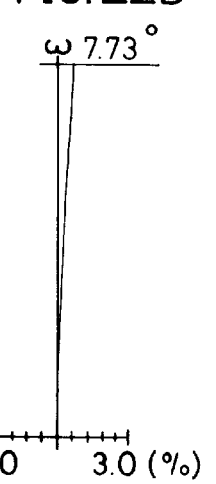
Figure 23A:
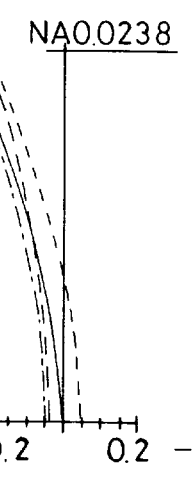
Figure 23B:
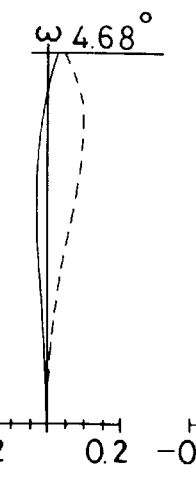
Figure 23C:
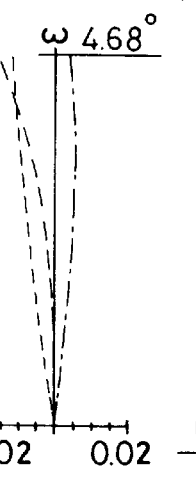
Figure 23D:
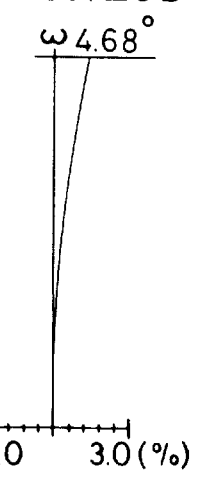
Figure 27A:
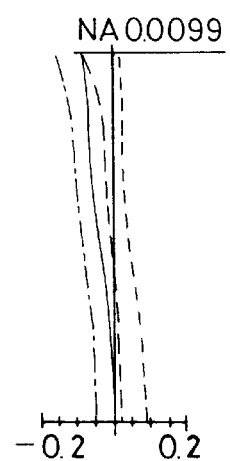
FIGS. 27A–27D are aberration diagrams of Example 4 at the wideangle end upon focusing on a finite object point.
Figure 27B:
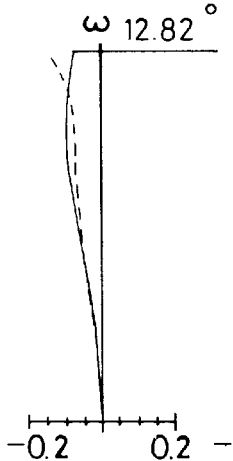
Figure 27C:
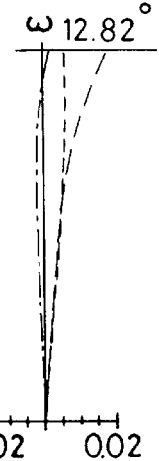
Figure 27D:
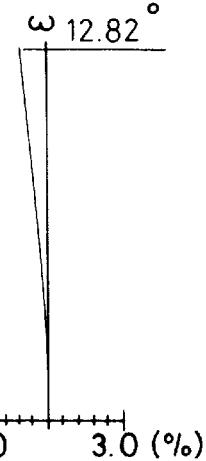
Figure 28A:
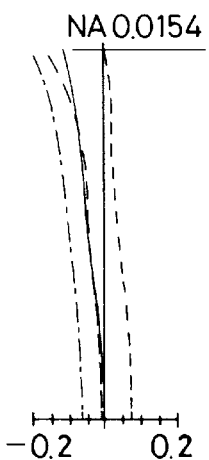
FIGS. 28A–28D are aberration diagrams of Example 4 at an intermediate focal distance upon focusing on a finite object point.
Figure 28B:
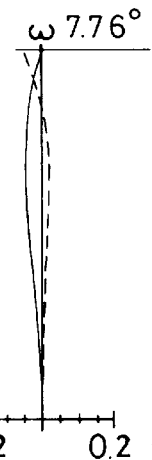
Figure 28C:
Figure 28D:
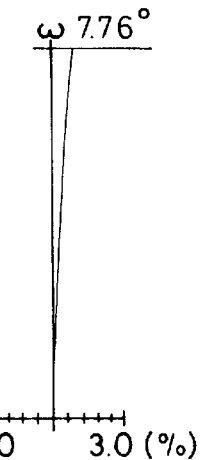
Figure 29A:
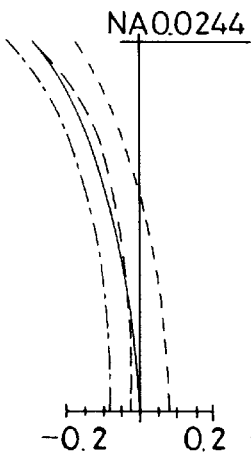
FIGS. 29A–29D are aberration diagrams of Example 4 at the telephoto end upon focusing on a finite object point.
Figure 29B:
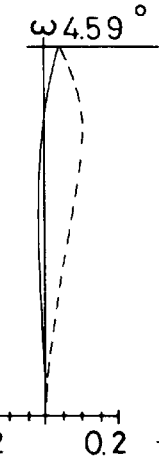
Figure 29C:
Figure 29D:
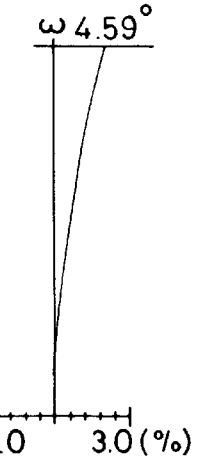

Example 3 is directed to a telephoto zoom lens system having a coverage angle of 30.02° to 12.63° and an aperture ratio of 1:2.88. Sectional views of this example are shown in FIGS. 3A and 3B. Aberration diagrams representing the performance of Example 3 at the wide-angle end, an intermediate focal distance and the telephoto end upon focusing on the object point at infinity are shown in FIGS. 18A–20D, and aberration diagrams representing the performance of Example 3 at the wide-angle end, an intermediate focal distance and the telephoto end upon focusing on a finite object point of about 1.7 m are shown in FIGS. 21–23.

Example 3 is characterized in that an increase in the absolute amount of spherical aberration at the telephoto end—which is noticeable in this optical system, i.e., a negative deviation of the third-order spherical aberration is better corrected on condition that focusing to a finite object point is achieved by the first lens group G1. When a certain lens group or groups are designed to move, it is of importance to control the amount of aberrations produced by the lens groups perse, i.e., the amount of aberrations produced upon focusing on the object point at infinity. For this reason, the first lens group G1 is constructed from two single positive lenses and a doublet. The resulting effect is shown in FIGS. 23A–23D.

In Example 4 analogous to Example 3, the second lens group G2 is made up of a negative meniscus lens, a negative meniscus lens located subsequent thereto, and a doublet. This doublet consists of a double-convex positive lens and a double-concave negative lens. Example 4 is characterized in that there is a difference in the state of higher-order aberrations produced. Moreover, the total length of the lens system is somewhat shorter. Sectional views of Example 4 are shown in FIGS. 4A and 4B. Aberration diagrams representing the performance of Example 4 at the wide-angle end, an intermediate focal distance and the telephoto end upon focusing on the object point at infinity are shown in FIGS. 24A–26D, and aberration diagrams representing the performance of Example 4 at the wide-angle end, an intermediate focal distance and the telephoto end upon focusing on a finite object point of about 1.7 m are shown in FIGS. 27A–29D.

Example 5 is directed to a telephoto zoom lens system having a coverage angle from 29.56° to 12.67° and an aperture ratio of 1:2.87. Sectional views of this example are shown in FIGS. 5A and 5B. Aberration diagrams representing the performance of Example 5 at the wide-angle end, an intermediate focal distance and the telephoto end upon focusing on the object point at infinity are shown in FIGS. 30A–32D, and aberration diagrams representing the performance of Example 5 at the wide-angle end, an intermediate focal distance and the telephoto end upon focusing on a finite object point of about 1.7 m are shown in FIGS. 33A–33D.

In Example 5, the first lens group G1 consists of a front sub-group made up of a doublet consisting of a positive meniscus lens and a negative meniscus lens, and a rear sub-group made up of a cemented doublet consisting of a negative lens and a positive lens, and a positive meniscus lens. Both sub-groups of the first lens group Gi are drawn out at different speeds during focusing while they are moved toward the object side. This enables the occurrence of the third-order spherical aberration alone to be inhibited and an aberration change at a nearby distance to be reduced. The second lens group G2 is made up of a negative lens, and a doublet consisting of a double-concave negative lens and a positive lens. The third lens group G3 consists of a negative meniscus lens alone. Of course, the third lens group G3 may also be made up of a cemented doublet. The fourth lens group G4, too, is of importance for correction of spherical aberration, and is similar in lens design to the preceding examples. The fifth lens group G5 consists of two positive lenses forming a preceding sub-group, a negative lens with an air separation between the preceding sub-group and it, and a negative meniscus lens and a positive lens subsequent thereto, which forms a rear sub-group.

The astigmatism variation is reduced, as can be seen from the aberration diagrams of Example 5 upon focusing on a finite object point of about 1.7 m shown in FIGS. 33B and 34B. As can also be seen from the aberration diagrams of FIG. 35, the spherical aberration change at the telephoto end is not only affected by the third-order aberration coefficient alone but also gives rise to high-order aberrations, so making it possible to reduce a change in the best image surface position.

Set out below are numerical data on each example. Symbols used hereinafter but not hereinbefore have the following meanings.

f Focal distance of the overall lens system
$F_{NO}$ F-number
ωHalf angle of field
$r_1$, $r_2$, Radii of curvature of the lens surfaces
$d_1$, $d_2$, Separations between adjacent lens surfaces
$n_{d1}$, $n_{d2}$, d-line refractive indices of the lenses
$V_{d1}$, $V_{d2}$, Abbe's number of the lenses

Example 1 f = 80.5~127.3~197.1
$F_{NO}$ = 2.88~2.88~2.88
ω = 15.45°~9.64°~6.17°

| | | | | | | | |
|---|---|---|---|---|---|---|---|
| $r_1$ = | 231.8024 | $d_1$ = | 6.830 | $n_{d1}$ = | 1.43875 | $v_{d1}$ = | 94.97 |
| $r_2$ = | −386.4399 | $d_2$ = | 0.100 | | | | |
| $r_3$ = | 83.5136 | $d_3$ = | 2.750 | $n_{d2}$ = | 1.72825 | $v_{d2}$ = | 28.46 |
| $r_4$ = | 57.7648 | $d_4$ = | 11.874 | $n_{d3}$ = | 1.49700 | $v_{d3}$ = | 81.61 |
| $r_5$ = | 1495.9827 | $d_5$ = | (Variable) | | | | |
| $r_6$ = | −393.6668 | $d_6$ = | 1.700 | $n_{d4}$ = | 1.77250 | $v_{d4}$ = | 49.60 |
| $r_7$ = | 104.0273 | $d_7$ = | 1.559 | | | | |
| $r_8$ = | 236.4773 | $d_8$ = | 1.900 | $n_{d5}$ = | 1.72000 | $v_{d5}$ = | 43.70 |
| $r_9$ = | 47.3727 | $d_9$ = | 8.215 | $n_{d6}$ = | 1.84666 | $v_{d6}$ = | 23.78 |
| $r_{10}$ = | −139.3884 | $d_{10}$ = | 0.171 | | | | |
| $r_{11}$ = | −253.2278 | $d_{11}$ = | 1.650 | $n_{d7}$ = | 1.72000 | $v_{d7}$ = | 43.70 |
| $r_{12}$ = | 65.5645 | $d_{12}$ = | (Variable) | | | | |
| $r_{13}$ = | −58.4701 | $d_{13}$ = | 1.850 | $n_{d8}$ = | 1.80610 | $v_{d8}$ = | 40.95 |
| $r_{14}$ = | −2555.6892 | $d_{14}$ = | (Variable) | | | | |
| $r_{15}$ = | −1749.6782 | $d_{15}$ = | 3.438 | $n_{d9}$ = | 1.74100 | $v_{d9}$ = | 52.65 |
| $r_{16}$ = | −113.5810 | $d_{16}$ = | 0.120 | | | | |
| $r_{17}$ = | 91.7362 | $d_{17}$ = | 7.453 | $n_{d10}$ = | 1.49700 | $v_{d10}$ = | 81.61 |
| $r_{18}$ = | −58.7132 | $d_{18}$ = | 1.900 | $n_{d11}$ = | 1.78470 | $v_{d11}$ = | 26.30 |
| $r_{19}$ = | −254.2326 | $d_{19}$ = | (Variable) | | | | |
| $r_{20}$ = | ∞ (Stop) | $d_{20}$ = | 1.580 | | | | |
| $r_{21}$ = | 65.6537 | $d_{21}$ = | 6.721 | $n_{d12}$ = | 1.77250 | $v_{d12}$ = | 49.60 |
| $r_{22}$ = | 863.4343 | $d_{22}$ = | 25.361 | | | | |
| $r_{23}$ = | −186.9700 | $d_{23}$ = | 2.000 | $n_{d13}$ = | 1.64769 | $v_{d13}$ = | 33.80 |
| $r_{24}$ = | 41.3985 | $d_{24}$ = | 0.120 | | | | |
| $r_{25}$ = | 29.3362 | $d_{25}$ = | 4.490 | $n_{d14}$ = | 1.49700 | $v_{d14}$ = | 81.61 |
| $r_{26}$ = | 73.4259 | $d_{26}$ = | 11.665 | | | | |
| $r_{27}$ = | 71.3310 | $d_{27}$ = | 3.911 | $n_{d15}$ = | 1.80518 | $v_{d15}$ = | 25.43 |
| $r_{28}$ = | −675.8988 | $d_{28}$ = | 16.930 | | | | |
| $r_{29}$ = | −23.6979 | $d_{29}$ = | 1.551 | $n_{d16}$ = | 1.64769 | $v_{d16}$ = | 33.80 |
| $r_{30}$ = | −65.8230 | $d_{30}$ = | 0.120 | | | | |
| $r_{31}$ = | 109.9586 | $d_{31}$ = | 3.268 | $n_{d17}$ = | 1.80100 | $v_{d17}$ = | 34.97 |
| $r_{32}$ = | −221.3749 | | | | | | |

Zooming Spaces

| f | 80.5 | 127.3 | 197.1 |
|---|---|---|---|
| $d_5$ | 3.9740 | 28.6580 | 44.6000 |
| $d_{12}$ | 13.6260 | 8.7750 | 8.2500 |
| $d_{14}$ | 29.9670 | 19.2200 | 2.2200 |
| $d_{19}$ | 13.2150 | 4.1300 | 5.7080 |

Example 2 f = 80.5~124.8~196.6
$F_{NO}$ = 2.85~2.85~2.85
ω = 15.45°~9.83°~6.19°

| | | | | | | | |
|---|---|---|---|---|---|---|---|
| $r_1$ = | 125.8722 | $d_1$ = | 2.650 | $n_{d1}$ = | 1.74077 | $v_{d1}$ = | 27.79 |
| $r_2$ = | 79.8317 | $d_2$ = | 12.190 | $n_{d2}$ = | 1.49700 | $v_{d2}$ = | 81.61 |
| $r_3$ = | −441.2787 | $d_3$ = | 0.150 | | | | |
| $r_4$ = | 107.9894 | $d_4$ = | 7.070 | $n_{d3}$ = | 1.43875 | $v_{d3}$ = | 94.97 |
| $r_5$ = | 980.0111 | $d_5$ = | (Variable) | | | | |
| $r_6$ = | −418.3135 | $d_6$ = | 1.850 | $n_{d4}$ = | 1.72000 | $v_{d4}$ = | 50.25 |
| $r_7$ = | 115.9507 | $d_7$ = | 0.827 | | | | |
| $r_8$ = | 158.1502 | $d_8$ = | 1.850 | $n_{d5}$ = | 1.70154 | $v_{d5}$ = | 41.24 |
| $r_9$ = | 41.7474 | $d_9$ = | 8.642 | $n_{d6}$ = | 1.84666 | $v_{d6}$ = | 23.78 |
| $r_{10}$ = | −175.7302 | $d_{10}$ = | 0.100 | | | | |
| $r_{11}$ = | −505.6635 | $d_{11}$ = | 1.650 | $n_{d7}$ = | 1.83481 | $v_{d7}$ = | 42.72 |
| $r_{12}$ = | 60.4107 | $d_{12}$ = | (Variable) | | | | |
| $r_{13}$ = | −57.6490 | $d_{13}$ = | 1.850 | $n_{d8}$ = | 1.80440 | $v_{d8}$ = | 39.58 |
| $r_{14}$ = | 739.8050 | $d_{14}$ = | (Variable) | | | | |
| $r_{15}$ = | −2528.9515 | $d_{15}$ = | 3.680 | $n_{d9}$ = | 1.77250 | $v_{d9}$ = | 49.60 |
| $r_{16}$ = | −116.1073 | $d_{16}$ = | 0.120 | | | | |
| $r_{17}$ = | 89.9955 | $d_{17}$ = | 8.000 | $n_{d10}$ = | 1.49700 | $v_{d10}$ = | 81.61 |
| $r_{18}$ = | −55.9794 | $d_{18}$ = | 1.850 | $n_{d11}$ = | 1.80518 | $v_{d11}$ = | 25.43 |

-continued

| | | | | | | | |
|---|---|---|---|---|---|---|---|
| $r_{19} =$ | −200.8718 | $d_{19} =$ | (Variable) | | | | |
| $r_{20} =$ | ∞ (Stop) | $d_{20} =$ | 1.580 | | | | |
| $r_{21} =$ | 58.7259 | $d_{21} =$ | 8.045 | $n_{d12} =$ | 1.77250 | $\nu_{d12} =$ | 49.60 |
| $r_{22} =$ | 377.6569 | $d_{22} =$ | 18.852 | | | | |
| $r_{23} =$ | −579.0489 | $d_{23} =$ | 4.459 | $n_{d13} =$ | 1.66680 | $\nu_{d13} =$ | 33.04 |
| $r_{24} =$ | 38.5508 | $d_{24} =$ | 0.120 | | | | |
| $r_{25} =$ | 28.4188 | $d_{25} =$ | 4.080 | $n_{d14} =$ | 1.48749 | $\nu_{d14} =$ | 70.21 |
| $r_{26} =$ | 58.6745 | $d_{26} =$ | 10.678 | | | | |
| $r_{27} =$ | 67.7937 | $d_{27} =$ | 3.761 | $n_{d15} =$ | 1.80518 | $\nu_{d15} =$ | 25.43 |
| $r_{28} =$ | −1826.1372 | $d_{28} =$ | 18.098 | | | | |
| $r_{29} =$ | −23.2205 | $d_{29} =$ | 1.650 | $n_{d16} =$ | 1.63636 | $\nu_{d16} =$ | 35.37 |
| $r_{30} =$ | −61.6604 | $d_{30} =$ | 0.120 | | | | |
| $r_{31} =$ | 100.4474 | $d_{31} =$ | 3.855 | $n_{d17} =$ | 1.80440 | $\nu_{d17} =$ | 39.58 |
| $r_{32} =$ | −317.4629 | | | | | | |

Zooming Spaces

| f | 80.5 | 124.8 | 196.6 |
|---|---|---|---|
| $d_5$ | 4.0280 | 28.5110 | 45.4810 |
| $d_{12}$ | 13.6740 | 9.0680 | 8.2500 |
| $d_{14}$ | 29.0210 | 19.0310 | 2.2200 |
| $d_{19}$ | 14.0200 | 4.1300 | 4.7810 |

Example 3

$f = 80.7 \sim 125.6 \sim 195.5$
$F_{NO} = 2.88 \sim 2.88 \sim 2.88$
$\omega = 15.46° \sim 9.77° \sim 6.24°$

| | | | | | | | |
|---|---|---|---|---|---|---|---|
| $r_1 =$ | 336.9116 | $d_1 =$ | 4.000 | $n_{d1} =$ | 1.49700 | $\nu_{d1} =$ | 81.61 |
| $r_2 =$ | −23748.4398 | $d_2 =$ | 0.150 | | | | |
| $r_3 =$ | 230.3256 | $d_3 =$ | 5.150 | $n_{d2} =$ | 1.49700 | $\nu_{d2} =$ | 81.61 |
| $r_4 =$ | 2863.9427 | $d_4 =$ | 0.120 | | | | |
| $r_5 =$ | 95.6264 | $d_5 =$ | 2.710 | $n_{d3} =$ | 1.80518 | $\nu_{d3} =$ | 25.43 |
| $r_6 =$ | 68.5233 | $d_6 =$ | 10.700 | $n_{d4} =$ | 1.49700 | $\nu_{d4} =$ | 81.61 |
| $r_7 =$ | −22523.2093 | $d_7 =$ | (Variable) | | | | |
| $r_8 =$ | 1989.0950 | $d_8 =$ | 1.850 | $n_{d5} =$ | 1.69680 | $\nu_{d5} =$ | 55.53 |
| $r_9 =$ | 109.2311 | $d_9 =$ | 1.980 | | | | |
| $r_{10} =$ | 646.1076 | $d_{10} =$ | 1.850 | $n_{d6} =$ | 1.72000 | $\nu_{d6} =$ | 50.25 |
| $r_{11} =$ | 45.8291 | $d_{11} =$ | 9.250 | $n_{d7} =$ | 1.84666 | $\nu_{d7} =$ | 23.78 |
| $r_{12} =$ | −122.9284 | $d_{12} =$ | 0.010 | | | | |
| $r_{13} =$ | −146.5921 | $d_{13} =$ | 2.000 | $n_{d8} =$ | 1.80440 | $\nu_{d8} =$ | 39.58 |
| $r_{14} =$ | 70.6965 | $d_{14} =$ | (Variable) | | | | |
| $r_{15} =$ | −56.7502 | $d_{15} =$ | 1.850 | $n_{d9} =$ | 1.80100 | $\nu_{d9} =$ | 34.97 |
| $r_{16} =$ | −26599.3365 | $d_{16} =$ | (Variable) | | | | |
| $r_{17} =$ | −1527.8133 | $d_{17} =$ | 3.680 | $n_{d10} =$ | 1.78590 | $\nu_{d10} =$ | 44.19 |
| $r_{18} =$ | −102.4188 | $d_{18} =$ | 0.100 | | | | |
| $r_{19} =$ | 80.3773 | $d_{19} =$ | 8.000 | $n_{d11} =$ | 1.49700 | $\nu_{d11} =$ | 81.61 |
| $r_{20} =$ | −56.7501 | $d_{20} =$ | 1.850 | $n_{d12} =$ | 1.80518 | $\nu_{d12} =$ | 25.43 |
| $r_{21} =$ | −314.8368 | $d_{21} =$ | (Variable) | | | | |
| $r_{22} =$ | ∞ (Stop) | $d_{22} =$ | 1.580 | | | | |
| $r_{23} =$ | 61.9033 | $d_{23} =$ | 5.450 | $n_{d13} =$ | 1.77250 | $\nu_{d13} =$ | 49.60 |
| $r_{24} =$ | 1097.1133 | $d_{24} =$ | 23.245 | | | | |
| $r_{25} =$ | −150.0466 | $d_{25} =$ | 2.756 | $n_{d14} =$ | 1.63980 | $\nu_{d14} =$ | 34.48 |
| $r_{26} =$ | 41.4321 | $d_{26} =$ | 0.150 | | | | |
| $r_{27} =$ | 29.8757 | $d_{27} =$ | 3.600 | $n_{d15} =$ | 1.43875 | $\nu_{d15} =$ | 94.97 |
| $r_{28} =$ | 71.4489 | $d_{28} =$ | 10.266 | | | | |
| $r_{29} =$ | 78.1675 | $d_{29} =$ | 3.750 | $n_{d16} =$ | 1.80518 | $\nu_{d16} =$ | 25.43 |
| $r_{30} =$ | −215.1444 | $d_{30} =$ | 18.392 | | | | |
| $r_{31} =$ | −24.2070 | $d_{31} =$ | 1.850 | $n_{d17} =$ | 1.63980 | $\nu_{d17} =$ | 34.48 |
| $r_{32} =$ | −72.0598 | $d_{32} =$ | 0.879 | | | | |
| $r_{33} =$ | 89.1113 | $d_{33} =$ | 3.850 | $n_{d18} =$ | 1.80440 | $\nu_{d18} =$ | 39.58 |
| $r_{34} =$ | −344.7726 | | | | | | |

Zooming Spaces

| f | 80.7 | 125.6 | 195.5 |
|---|---|---|---|
| $d_7$ | 3.7955 | 27.8634 | 44.6000 |
| $d_{14}$ | 16.0719 | 8.7700 | 6.2458 |
| $d_{16}$ | 25.1125 | 16.2873 | 1.2500 |
| $d_{21}$ | 12.1535 | 4.2118 | 5.0358 |

-continued

Example 4

$f = 78.2 \sim 125.0 \sim 200.0$
$F_{NO} = 2.85 \sim 2.85 \sim 2.85$
$\omega = 15.46° \sim 9.82° \sim 6.14°$

| | | | | | | | |
|---|---|---|---|---|---|---|---|
| $r_1 =$ | 309.3175 | $d_1 =$ | 4.000 | $n_{d1} =$ | 1.51823 | $\nu_{d1} =$ | 58.96 |
| $r_2 =$ | 1156.8161 | $d_2 =$ | 0.150 | | | | |
| $r_3 =$ | 212.6865 | $d_3 =$ | 5.150 | $n_{d2} =$ | 1.49700 | $\nu_{d2} =$ | 81.61 |
| $r_4 =$ | −31352.9900 | $d_4 =$ | 0.118 | | | | |
| $r_5 =$ | 97.7567 | $d_5 =$ | 2.710 | $n_{d3} =$ | 1.80518 | $\nu_{d3} =$ | 25.43 |
| $r_6 =$ | 68.7793 | $d_6 =$ | 10.074 | $n_{d4} =$ | 1.49700 | $\nu_{d4} =$ | 81.61 |
| $r_7 =$ | −55083.5452 | $d_7 =$ | (Variable) | | | | |
| $r_8 =$ | 1245.7782 | $d_8 =$ | 1.735 | $n_{d5} =$ | 1.69680 | $\nu_{d5} =$ | 55.53 |
| $r_9 =$ | 122.9381 | $d_9 =$ | 1.733 | | | | |
| $r_{10} =$ | 628.8853 | $d_{10} =$ | 1.730 | $n_{d6} =$ | 1.69350 | $\nu_{d6} =$ | 53.23 |
| $r_{11} =$ | 46.4462 | $d_{11} =$ | 0.389 | | | | |
| $r_{12} =$ | 45.6991 | $d_{12} =$ | 9.105 | $n_{d7} =$ | 1.80518 | $\nu_{d7} =$ | 25.43 |
| $r_{13} =$ | −112.5489 | $d_{13} =$ | 0.010 | | | | |
| $r_{14} =$ | −123.7639 | $d_{14} =$ | 1.736 | $n_{d8} =$ | 1.79952 | $\nu_{d8} =$ | 42.24 |
| $r_{15} =$ | 71.6609 | $d_{15} =$ | (Variable) | | | | |
| $r_{16} =$ | −62.9133 | $d_{16} =$ | 1.662 | $n_{d9} =$ | 1.80440 | $\nu_{d9} =$ | 39.58 |
| $r_{17} =$ | 751.7277 | $d_{17} =$ | (Variable) | | | | |
| $r_{18} =$ | 1521.2716 | $d_{18} =$ | 3.679 | $n_{d10} =$ | 1.77250 | $\nu_{d10} =$ | 49.60 |
| $r_{19} =$ | −123.9830 | $d_{19} =$ | 0.091 | | | | |
| $r_{20} =$ | 87.6368 | $d_{20} =$ | 7.988 | $n_{d11} =$ | 1.49700 | $\nu_{d11} =$ | 81.61 |
| $r_{21} =$ | −54.8196 | $d_{21} =$ | 1.561 | $n_{d12} =$ | 1.80518 | $\nu_{d12} =$ | 25.43 |
| $r_{22} =$ | −259.3412 | $d_{22} =$ | (Variable) | | | | |
| $r_{23} =$ | ∞ (Stop) | $d_{23} =$ | 1.579 | | | | |
| $r_{24} =$ | 55.0805 | $d_{24} =$ | 5.250 | $n_{d13} =$ | 1.77250 | $\nu_{d13} =$ | 49.60 |
| $r_{25} =$ | 1170.9252 | $d_{25} =$ | 19.624 | | | | |
| $r_{26} =$ | −142.1988 | $d_{26} =$ | 4.281 | $n_{d14} =$ | 1.66680 | $\nu_{d14} =$ | 33.04 |
| $r_{27} =$ | 36.2267 | $d_{27} =$ | 0.097 | | | | |
| $r_{28} =$ | 30.2868 | $d_{28} =$ | 3.141 | $n_{d15} =$ | 1.48749 | $\nu_{d15} =$ | 70.21 |
| $r_{29} =$ | 60.0358 | $d_{29} =$ | 8.377 | | | | |
| $r_{30} =$ | 70.9696 | $d_{30} =$ | 3.323 | $n_{d16} =$ | 1.80518 | $\nu_{d16} =$ | 25.43 |
| $r_{31} =$ | −205.2663 | $d_{31} =$ | 20.755 | | | | |
| $r_{32} =$ | −24.8128 | $d_{32} =$ | 1.650 | $n_{d17} =$ | 1.66680 | $\nu_{d17} =$ | 33.04 |
| $r_{33} =$ | −58.0102 | $d_{33} =$ | 1.878 | | | | |
| $r_{34} =$ | 94.4326 | $d_{34} =$ | 3.600 | $n_{d18} =$ | 1.80440 | $\nu_{d18} =$ | 39.58 |
| $r_{35} =$ | −687.2626 | | | | | | |

Zooming Spaces

| f | 78.2 | 125.0 | 200.0 |
|---|---|---|---|
| $d_7$ | 3.7000 | 27.7300 | 45.4730 |
| $d_{15}$ | 16.5780 | 8.8760 | 6.2950 |
| $d_{17}$ | 26.9310 | 17.8630 | 1.2550 |
| $d_{22}$ | 11.2490 | 3.9390 | 5.3930 |

Example 5

$f = 82.0 \sim 129.5 \sim 194.9$
$F_{NO} = 2.87 \sim 2.87 \sim 2.87$
$\omega = 14.96° \sim 9.48° \sim 6.18°$

| | | | | | | | |
|---|---|---|---|---|---|---|---|
| $r_1 =$ | 149.9031 | $d_1 =$ | 4.763 | $n_{d1} =$ | 1.49700 | $\nu_{d1} =$ | 81.61 |
| $r_2 =$ | 400.8121 | $d_2 =$ | 0.100 | | | | |
| $r_3 =$ | 107.2120 | $d_3 =$ | 2.000 | $n_{d2} =$ | 1.74000 | $\nu_{d2} =$ | 31.71 |
| $r_4 =$ | 69.5641 | $d_4 =$ | (Variable) | | | | |
| $r_5 =$ | 69.6186 | $d_5 =$ | 2.050 | $n_{d3} =$ | 1.84666 | $\nu_{d3} =$ | 23.88 |
| $r_6 =$ | 66.7952 | $d_6 =$ | 11.510 | $n_{d4} =$ | 1.49700 | $\nu_{d4} =$ | 81.61 |
| $r_7 =$ | 3637.1632 | $d_7 =$ | 0.100 | | | | |
| $r_8 =$ | 177.3870 | $d_8 =$ | 4.264 | $n_{d5} =$ | 1.49700 | $\nu_{d5} =$ | 81.61 |
| $r_9 =$ | 910.6598 | $d_9 =$ | (Variable) | | | | |
| $r_{10} =$ | 817.9745 | $d_{10} =$ | 1.600 | $n_{d6} =$ | 1.77250 | $\nu_{d6} =$ | 49.60 |
| $r_{11} =$ | 52.6529 | $d_{11} =$ | 5.888 | | | | |
| $r_{12} =$ | −146.0056 | $d_{12} =$ | 2.000 | $n_{d7} =$ | 1.65830 | $\nu_{d7} =$ | 57.33 |
| $r_{13} =$ | 49.6098 | $d_{13} =$ | 0.436 | | | | |
| $r_{14} =$ | 51.3855 | $d_{14} =$ | 6.396 | $n_{d8} =$ | 1.84666 | $\nu_{d8} =$ | 23.78 |
| $r_{15} =$ | ∞ | $d_{15} =$ | (Variable) | | | | |
| $r_{16} =$ | −62.4737 | $d_{16} =$ | 2.000 | $n_{d9} =$ | 1.74950 | $\nu_{d9} =$ | 35.27 |
| $r_{17} =$ | −141.6970 | $d_{17} =$ | (Variable) | | | | |
| $r_{18} =$ | 240.9969 | $d_{18} =$ | 5.539 | $n_{d10} =$ | 1.65830 | $\nu_{d10} =$ | 57.33 |
| $r_{19} =$ | −87.4035 | $d_{19} =$ | 0.100 | | | | |
| $r_{20} =$ | 103.9750 | $d_{20} =$ | 7.270 | $n_{d11} =$ | 1.49700 | $\nu_{d11} =$ | 81.61 |
| $r_{21} =$ | −70.6483 | $d_{21} =$ | 1.850 | $n_{d12} =$ | 1.80610 | $\nu_{d12} =$ | 40.95 |
| $r_{22} =$ | 1132.4424 | $d_{22} =$ | (Variable) | | | | |
| $r_{23} =$ | ∞ (Stop) | $d_{23} =$ | 0.500 | | | | |

-continued

| | | | | | | |
|---|---|---|---|---|---|---|
| $r_{24}=$ | 50.5036 | $d_{24}=$ | 6.630 | $n_{d13}=$ | 1.49700 | $v_{d13}=$ 81.61 |
| $r_{25}=$ | 2063.4959 | $d_{25}=$ | 0.100 | | | |
| $r_{26}=$ | 44.4913 | $d_{26}=$ | 3.648 | $n_{d14}=$ | 1.78650 | $v_{d14}=$ 50.00 |
| $r_{27}=$ | 62.3650 | $d_{27}=$ | 8.056 | | | |
| $r_{28}=$ | 142.6521 | $d_{28}=$ | 4.300 | $n_{d15}=$ | 1.64769 | $v_{d15}=$ 33.80 |
| $r_{29}=$ | 30.9916 | $d_{29}=$ | 20.138 | | | |
| $r_{30}=$ | 85.8115 | $d_{30}=$ | 2.000 | $n_{d16}=$ | 1.80100 | $v_{d16}=$ 34.97 |
| $r_{31}=$ | 41.0796 | $d_{31}=$ | 12.999 | | | |
| $r_{32}=$ | 60.7097 | $d_{32}=$ | 5.402 | $n_{d17}=$ | 1.70154 | $v_{d17}=$ 41.24 |
| $r_{33}=$ | −329.4878 | | | | | |

Zooming Spaces

| f | 82.0 | 129.5 | 194.9 |
|---|---|---|---|
| $d_4$ | 6.1963 | 6.1963 | 6.1963 |
| $d_9$ | 4.4140 | 30.3891 | 44.7483 |
| $d_{15}$ | 9.0204 | 6.4894 | 5.1854 |
| $d_{17}$ | 43.2449 | 28.8392 | 7.5425 |
| $d_{22}$ | 10.5361 | 1.5000 | 9.7330 |
| | −0.062 X | −0.0982X | −0.135 X |
| $d_4$ | 1.827 | 1.686 | 1.652 |
| $d_9$ | 18.445 | 44.728 | 57.688 |
| $d_{15}$ | 9.0204 | 6.4894 | 5.1854 |
| $d_{17}$ | 43.2449 | 28.8392 | 7.5425 |
| $d_{22}$ | 10.5361 | 1.5000 | 9.7330 |

Set out below are the values of parameters concerning inequalities (1) to (10) in Examples 1–5.

TABLE 5

| Example | $|\beta_{2W} \cdot \beta_{3W}|$ | $|\beta_{2T} \cdot \beta_{3T}|$ | $\beta_{3W}$ | $\beta_{3T}$ |
|---|---|---|---|---|
| 1 | 0.5283 | 1.2860 | 0.1625 | −0.2117 |
| 2 | 0.5143 | 1.2498 | 0.1047 | −0.2990 |
| 3 | 0.4909 | 1.1814 | 0.1834 | −0.1538 |
| 4 | 0.4991 | 1.2197 | 0.1717 | −0.1853 |
| 5 | 0.6134 | 1.4616 | 0.4598 | 0.2225 |

| Example | $D_{2W}$ | $D_{2T}$ | $\phi_1/\phi_3$ | $\phi_2/\phi_3$ | $\phi_4/\phi_3$ |
|---|---|---|---|---|---|
| 1 | 13.626 | 8.250 | −0.55416 | 0.86305 | −0.72712 |
| 2 | 13.674 | 8.250 | −0.49565 | 0.70945 | −0.69371 |
| 3 | 16.072 | 6.246 | −0.5275 | 0.8767 | −0.7570 |
| 4 | 16.578 | 6.295 | −0.5299 | 0.8563 | −0.72310 |
| 5 | 9.02 | 5.185 | −1.11552 | 2.2321 | −1.54744 |

| Example | $\phi_5/\phi_3$ | $\phi_{51}/\phi_5$ | $\phi_{52}/\phi_5$ | $\phi_{53}/\phi_5$ |
|---|---|---|---|---|
| 1 | −0.73571 | 1.10134 | −0.90631 | 0.76167 |
| 2 | −0.65209 | 1.14391 | −0.98164 | 0.76679 |
| 3 | −0.74166 | 1.12987 | −1.07813 | 0.91505 |
| 4 | −0.76264 | 1.26624 | −1.45103 | 1.07295 |
| 5 | −0.95211 | 1.52130 | −1.53485 | 0.84418 |

As can be appreciated from the foregoing explanation, the present invention can successfully provide a telephoto zoom lens system of large aperture ratio and high image quality, which is made up of, in order from the object side, a zooming lens unit consisting of a first lens group having a positive refracting power and second and third lens groups located subsequent thereto, each having a negative refracting power, a fourth lens group designed for correction of an image surface and having a positive refracting power, and a fifth lens group forming an image-formation unit, and in which specific conditions are provided.

Furthermore in the present invention, the third-order spherical aberration—which induces a large change of optical performance in the telephoto zone, and so becomes a grave problem—is compensated for by promoting the occurrence of higher-order aberrations by making some modification to lens construction, whereby the movement of the best image surface can be inhibited.

What is claimed is:

1. A zoom lens system comprising, in order from the object side:

a first lens group having a positive refractive power;

a second lens group having a negative refractive power;

a third lens group having a negative refractive power;

a fourth lens group having a positive refractive power; and a fifth lens group having a positive refractive power, wherein the second and third lens groups are moved alone the optical axis with a separation therebetween varied while the first and fifth lens groups remain fixed for zooming from the wide-angle end to the telephoto end, and the fourth lens group is moved along the optical axis for correction of a change in the image surface position caused by zooming, said zoom lens system satisfies the following conditional inequality (4):

$$0.2<|\phi_1/\phi_3|<1.5 \ldots \qquad (4)$$

where $\phi_1$ is the refracting power of the first lens group, and $\phi_3$ is the refracting power of the third lens group.

2. A zoom lens system comprising, in order from the object side:

a first lens group having a positive refractive power;

a second lens group having a negative refractive power;

a third lens group having a negative refractive power;

a fourth lens group having a positive refractive power; and a fifth lens group having a positive refractive power, wherein the second and third lens groups are moved along the optical axis with a separation therebetween varied while the first and fifth lens groups remain fixed for zooming from the wide-angle end to the telephoto end, and the fourth lens group is moved along the optical axis for correction of a change in the image surface position caused by zooming, said zoom lens system satisfies the following conditional inequality (5):

$$0.4 < \phi_2/\phi_3 < 2.5 \ldots \quad (5)$$

where $\phi_2$ is the refracting power of the second lens group, and $\phi_3$ is the refracting power of the third lens group.

3. A zoom lens system comprising, in order from the object side:

a first lens group having a positive refractive power, a second lens group having a negative refractive power;

a third lens group having a negative refractive power;

a fourth lens group having a positive refractive power; and a fifth lens group having a positive refractive power, wherein the second and third lens groups are moved along the optical axis with a separation therebetween varied while the first and fifth lens groups remain fixed for zooming from the wide-angle end to the telephoto end, and the fourth lens group is moved along the optical axis for correction of a change in the image surface position caused by zooming, said zoom lens system satisfies the following conditional inequality (6):

$$0.5 < |\phi_4/\phi_3| < 2.0 \ldots \quad (6)$$

where $\phi_3$ is the refracting power of the third lens group, and $\phi_4$ is the refracting power of the fourth lens group.

4. A zoom lens system comprising, in order from the object side:

a first lens group having a positive refractive power, a second lens group having a negative refractive power;

a third lens group having a negative refractive power;

a fourth lens group having a positive refractive power; and a fifth lens group having a positive refractive power, wherein the second and third lens groups are moved along the optical axis with a separation therebetween varied while the first and fifth lens groups remain fixed for zooming from the wide-angle end to the telephoto end, and the fourth lens group is moved along the optical axis for correction of a change in the image surface position caused by zooming, said zoom lens system satisfies the following conditional inequality (4):

$$0.4 < |\phi_5/\phi_3| < 1.5 \quad (7)$$

where $\phi_3$ is the refracting power of the third lens group, and $\phi_5$ is the refracting power of the fifth lens group.

5. A zoom lens system according to claim 1, 2, 3 or 4, which satisfies the following conditional inequality (1):

$$|\beta_{2W} \cdot \beta_{3W}| < |\beta_{2T} \cdot \beta_{3T}| \ldots \quad (1)$$

where $\beta_{2W}$ is the lateral magnification of the second lens group at the wide-angle end, $\beta_{2T}$ is the lateral magnification of the second lens group at the telephone end, $\beta_{3W}$ is the lateral magnification of the third lens group at the wide-angle end, and $\beta_{3T}$ is the lateral magnification of the third lens group at the telephone end.

6. A zoom lens system according to claim 1, 2, 3 or 4, which satisfies the following conditional inequality (2):

$$\beta_{3W} > \beta_{3T} \ldots \quad (2)$$

$\beta_{3W}$ is the lateral magnification of the third lens group at the wide-angle end, and $\beta_{3T}$ is the lateral magnification of the third lens group at the telephoto end.

7. A zoom lens system according to claim 1, 2, 3 or 4 which satisfies the following conditional inequality (3):

$$D_{2W} > D_{2T} \ldots \quad (3)$$

where $D_{2W}$ is the separation between the second and third lens groups at the wide-angle end, and $D_{2T}$ is the separation between the second and third lens groups at the telephoto end.

8. A zoom lens system comprising, in order from the object side:

a first lens group having a positive refractive power:

a second lens group having a negative refractive power;

a third lens group having a negative refractive power;

a fourth lens group having a positive refractive power; and a fifth lens group having a positive refractive power, wherein the second and third lens groups arc moved along the optical axis with a separation therebetween varied while the first and fifth lens groups remain fixed for zooming from the wide-angle end to the telephoto end, and the fourth lens group is moved along the optical axis for correction of a change in the image surface position caused by zooming, said fourth lens group moves from the wide-angle end to the telephoto end first toward the image side, and then toward the object side, said zoom lens system satisfies the following conditional inequality (4):

$$0.2 < |\phi_1/\phi_3| < 1.5 \ldots \quad (4)$$

where $\phi_1$ is the refracting power of the first lens group, and $\phi_3$ is the refracting power of the third lens group.

9. A zoom lens system comprising, in order from the object side:

a first lens group having a positive refractive power;

a second lens group having a negative refractive power;

a third lens group having a negative refractive power;

a fourth lens group having a positive refractive power; and a fifth lens group having a positive refractive power, wherein the second and third lens groups are moved along the optical axis with a separation therebetween varied while the first and fifth lens groups remain fixed for zooming from the wide-angle end to the telephoto end, and the fourth lens group is moved along the optical axis for correction of a change in the image surface position caused by zooming, said fourth lens group moves from the wide-angle end to the telephoto end first toward the image side, and then toward the object side, said zoom lens system satisfies the following conditional inequality (5):

$$0.4 < \phi_2/\phi_3 < 2.5 \ldots \tag{5}$$

where $\phi_2$ is the refracting power of the second lens group, and $\phi_3$ is the refracting power of the third lens group.

10. A zoom lens system comprising, in order from the object side:

a first lens group having a positive refractive power;

a second lens group having a negative refractive power;

a third lens group having a negative refractive power;

a fourth lens group having a positive refractive power; and a fifth lens group having a positive refractive power, wherein the second and third lens groups are moved along the optical axis with a separation therebetween varied while the first and fifth lens groups remain fixed for zooming from the wide-angle end to the telephoto end, and the fourth lens group is moved along the optical axis for correction of a change in the image surface position caused by zooming, said fourth lens group moves from the wide-angle end to the telephoto end first toward the image side, and then toward the object side, said zoom lens system satisfies the following conditional inequality (6):

$$0.5 < |\phi_4/\phi_3| < 2.0 \ldots \tag{6}$$

where $\phi_3$ is the refracting power of the third lens group, and $\phi_4$ is the refracting power of the fourth lens group.

11. A zoom lens system comprising, in order from the object side:

a first lens group having a positive refractive power;

a second lens group having a negative refractive power;

a third lens group having a negative refractive power;

a fourth lens group having a positive refractive power; and a fifth lens group having a positive refractive power, wherein the second and third lens groups are moved along the optical axis with a separation therebetween varied while the first and fifth lens groups remain fixed for zooming from the wide-angle end to the telephoto end, and the fourth lens group is moved along the optical axis for correction of a change in the image surface position caused by zooming, said fourth lens group moves from the wide-angle end to the telephoto end first toward the image side, and then toward the object side, said zoom lens system satisfies the following conditional inequality (7):

$$0.4 < |\phi_5/\phi_3| < 1.5 \ldots \tag{7}$$

where $\phi_3$ is the refracting power of the third lens group, and $\phi_5$ is the refracting power of the fifth lens group.

12. A zoom lens system, in order from an object side, comprising:

a first lens group having a positive refractive power;

a second lens group having a negative refractive power;

a third lens group having a negative refractive power;

a fourth lens group having a positive refractive power; and a fifth lens group having a positive refractive power, wherein the second and third lens groups are moved along an optical axis with a separation therebetween varied while the first and fifth lens groups remain fixed for zooming from the wide-angle end to the telephoto end, and the fourth lens group is moved along the optical axis for correction of a change in the image surface position caused by zooming, and said zoom lens system satisfies the inequalities $$0.2 < |\phi_1/|\phi_3| < 1.5 \tag{4}$$

and $$0.4 < \phi_2/\phi_3 < 2.5 \tag{5}$$

where $\phi_1$ is a refracting power of said first lens group, $\phi_2$ is a refracting power of said second lens group, and $\phi_3$ is a refracting power of said third lens group.

13. A zoom lens system, in order from an object side, comprising:

a first lens group having a positive refractive power;

a second lens group having a negative refractive power;

a third lens group having a negative refractive power;

a fourth lens group having a positive refractive power; and a fifth lens group having a positive refractive power, wherein the second and third lens groups are moved along an optical axis with a separation therebetween varied while the first and fifth lens groups remain fixed for zooming from the wide-angle end to the telephoto end, and the fourth lens group is moved along the optical axis for correction of a change in the image surface position caused by zooming, and said zoom lens system satisfies the inequalities $$0.5 < |\phi_4/\phi_3| < 2.0 \tag{6}$$

and $$0.4<|\phi_5/\phi_3|<1.5 \tag{7}$$

where $\phi_3$ is a refracting power of said third lens group, $\phi_4$ is a refracting power of said fourth lens group, and $\phi_5$ is a refracting power of said fifth lens group.

14. A zoom lens system, in order from an object side, comprising:

a first lens group having a positive refractive power;

a second lens group having a negative refractive power;

a third lens group having a negative refractive power;

a fourth lens group having a positive refractive power; and a fifth lens group having a positive refractive power, wherein the second and third lens groups are moved along an optical axis with a separation therebetween varied while the first and fifth lens groups remain fixed for zooming from the wide-angle end to the telephoto end, and the fourth lens group is moved along the optical axis for correction of a change in the image surface position caused by zooming, and said second lens group comprises, in order from the object side, a negative lens, a doublet lens, and a negative lens.

15. A zoom lens system comprising, in order from the object side:

a first lens group having a positive refractive power;

a second lens group having a negative refractive power;

a third lens group having a negative refractive power;

a fourth lens group having a positive refractive power; and a fifth lens group having a positive refractive power;

wherein the second and third lens groups are moved along the optical axis with a separation therebetween varied while the first and fifth lens groups remain fixed for zooming from the wide-angle and to the telephoto end, and the fourth lens group is moved along the optical axis for correction of a change in the image surface position caused by zooming, and a lens in the fifth lens group nearest to the object side is a positive single lens.

16. A zoom lens system according to claim 12, 13, 14, or 15, which satisfies the following conditional inequality (1):

$$|\beta_{2W}\cdot\beta_{3W}|<|\beta_{2T}\cdot\beta_{3T}| \tag{1}$$

where $\beta_{2W}$ is the lateral magnification of the second lens group at the wide-angle end, $\beta_{2T}$ is the lateral magnification of the second lens group at the telephoto end, $\beta_{3W}$ is the lateral magnification of the third lens group at the wide-angle end, and $\beta_{3T}$ is the lateral magnification of the third lens group at the telephoto end.

17. A zoom lens system according to claim 12, 13, 14 or 15, which satisfies the following conditional inequality (2):

$$\beta_{3W}>\beta_{3T} \tag{2}$$

where $\beta_{3W}$ is the lateral magnification of the third lens group at the wide-angle end, and $\beta_{3T}$ is the lateral magnification of the third lens group at the telephoto end.

18. A zoom lens system according to claim 12, 13, 14 or 15, which satisfies the following conditional inequality (3):

$$D_{2W}>D_{2T} \tag{3}$$

where $D_{2W}$ is the separation between the second and third lens groups at the wide-angle end, and $D_{2T}$ is the separation between the second and third lens groups at the telephoto end.

19. A zoom lens system according to claim 12, 13, 14 or 15, wherein said fifth lens group consists of a first lens sub-group having a positive refracting power, a second lens sub-group having a negative refracting power and a third lens sub-group having a positive refracting power, said zoom lens system satisfies the following conditional inequality (8):

$$0.8<\phi_{51}/\phi_5<2 \tag{8}$$

where $\phi_5$ is the refracting power of the fifth lens group, and $\phi_{51}$ is the refracting power of the first lens sub-group of the fifth lens group.

20. A zoom lens system according to claim 12, 13, 14 or 15, wherein said fifth lens group consists of a first lens sub-group having a positive refracting power, a second lens sub-group having a negative refracting power and a third lens sub-group having a positive refracting power, said zoom lens system satisfies the following conditional inequality (9):

$$0.5<|\phi_{52}/\phi_5|<2 \tag{9}$$

where $\phi_5$ is the refracting power of the fifth lens group, and $\phi_{52}$ is the refracting power of the second lens sub-group of the fifth lens group.

21. A zoom lens system according to claim 12, 13, 14 or 15, wherein said fifth lens group consists of a first lens sub-group having a positive refracting power, a second lens sub-group having a negative refracting power and a third lens sub-group having a positive refracting power, said zoom lens system satisfies the following conditional inequality:

$$0.5<\phi_{53}/\phi_5<1.5$$

where $\phi_{52}$ is the refracting power of the fifth lens group, and $\phi_{53}$ is the refracting power of the third lens sub-group of the fifth lens group.

22. A zoom lens system according to claim 12, 13, 14 or 15, wherein the second and third lens groups are moved toward the image side during zooming from the wide-angle end to the telephoto end.

23. he zoom lens system according to claim 12, 13, 14 or 15, wherein at least the first lens group is moved along the optical axis for focusing from the object point at infinity to a finite object point, and the first and fifth lens groups are constructed such that, upon focusing on the object point at infinity, a third-order spherical aberration coefficient $SA_5$ produced within the fifth lens group and a third-order spherical aberration coefficient $SA_1$ produced within the first lens group satisfy the following condition:

$$SA_1/10 \geq SA_5.$$

24. A zoom lens system according to claim 5, which satisfies the following conditional inequality (3):

$$D_{2W} > D_{2T} \ldots \tag{3}$$

where $D_{2W}$ is the separation between the second and third lens groups at the wide-angle end, and $D_{2T}$ is the separation between the second and third lens groups at the telephoto end.

25. A zoom lens system according to claim 6, which satisfies the following conditional inequality (3):

$$D_{2W} > D_{2T} \ldots \tag{3}$$

where $D_{2W}$ is the separation between the second and third lens groups at the wide-angle end, and $D_{2T}$ is the separation between the second and third lens groups at the telephoto end.

* * * * *